United States Patent
Cherian et al.

(10) Patent No.: US 10,314,066 B2
(45) Date of Patent: Jun. 4, 2019

(54) TECHNIQUES FOR PROTECTING COMMUNICATIONS IN WIRELESS LOCAL AREA NETWORKS

(71) Applicant: QUALCOMM Incorporated, San Diego, CA (US)

(72) Inventors: George Cherian, San Diego, CA (US); Simone Merlin, San Diego, CA (US); Gwendolyn Denise Barriac, Encinitas, CA (US); Gang Ding, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 172 days.

(21) Appl. No.: 15/145,684

(22) Filed: May 3, 2016

(65) Prior Publication Data

US 2016/0330757 A1    Nov. 10, 2016

Related U.S. Application Data

(60) Provisional application No. 62/157,416, filed on May 5, 2015.

(51) Int. Cl.
*H04W 72/12* (2009.01)
*H04W 28/26* (2009.01)
(Continued)

(52) U.S. Cl.
CPC .......... *H04W 72/1268* (2013.01); *H04J 1/16* (2013.01); *H04L 5/0055* (2013.01);
(Continued)

(58) Field of Classification Search
CPC ......... H04W 72/1268; H04W 28/0252; H04W 72/0413; H04W 72/0453; H04W 28/26;
(Continued)

(56) References Cited

U.S. PATENT DOCUMENTS

2012/0087355 A1* 4/2012 Wentink ............. H04W 74/006
370/338
2012/0134324 A1* 5/2012 Chu ................. H04W 74/0816
370/329
(Continued)

FOREIGN PATENT DOCUMENTS

WO    WO-2009147570 A1    12/2009

OTHER PUBLICATIONS

ISA/EPO, International Search Report and Written Opinion of the International Searching Authority, Int'l. App. No. PCT/US2016/030772, dated Jul. 25, 2016, European Patent Office, Rijswijk, NL, 11 pgs.

*Primary Examiner* — Pao Sinkantarakorn
*Assistant Examiner* — Kabir U Jahangir
(74) *Attorney, Agent, or Firm* — Holland & Hart LLP/Qualcomm

(57) ABSTRACT

Methods, systems, and devices are described for wireless communications. A network may employ additional contention based parameters to support MU transmissions and to communicate to other devices a duration that protects MU transmission. For example, a first device may transmit a first message to reserve a subband of shared spectrum. The first message may be addressed to multiple devices and may indicate a channel access deferral duration to other devices within transmission range. The non-addressed devices may refrain from accessing the channel for an indicated duration. The addressed devices that receive the first message may respond to the first message with a second message, which may also be used to reserve the channel. The second message may additionally be used to identify those devices that received the first message. The first device may generate a trigger message based on the received second messages.

68 Claims, 15 Drawing Sheets

(51) Int. Cl.
*H04J 1/16* (2006.01)
*H04L 5/00* (2006.01)
*H04W 28/02* (2009.01)
*H04W 72/04* (2009.01)
*H04W 84/12* (2009.01)

(52) U.S. Cl.
CPC ....... *H04W 28/0252* (2013.01); *H04W 28/26* (2013.01); *H04W 72/0413* (2013.01); *H04W 72/0453* (2013.01); *H04W 84/12* (2013.01)

(58) Field of Classification Search
CPC ..... H04W 84/12; H04W 48/10; H04W 48/12; H04J 1/16; H04L 5/0055
See application file for complete search history.

(56) References Cited

U.S. PATENT DOCUMENTS

2013/0286959 A1\* 10/2013 Lou ................... H04W 72/04
 370/329
2013/0301551 A1 11/2013 Ghosh et al.
2017/0202026 A1\* 7/2017 Ahn ................ H04W 74/0833

\* cited by examiner

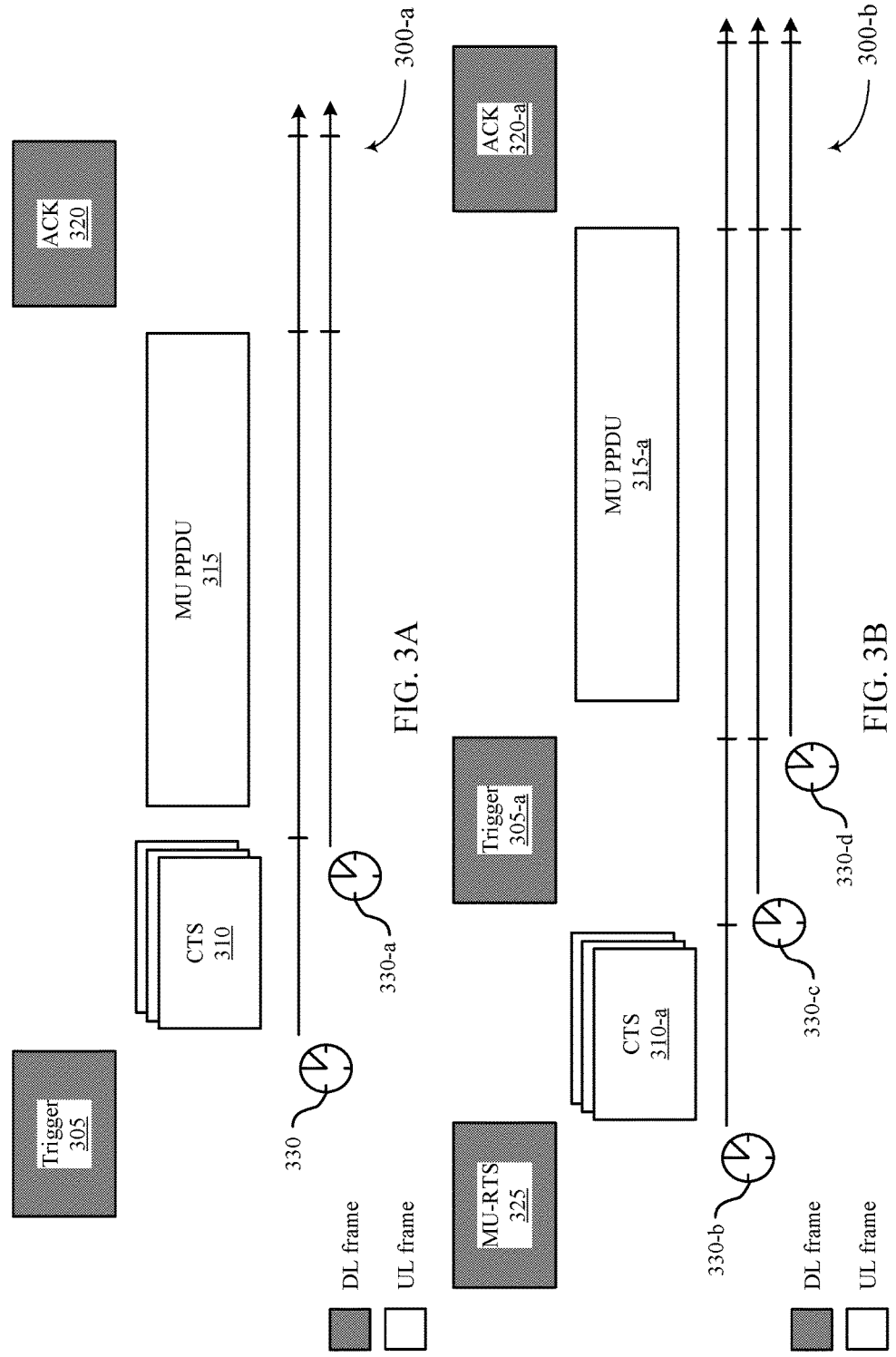

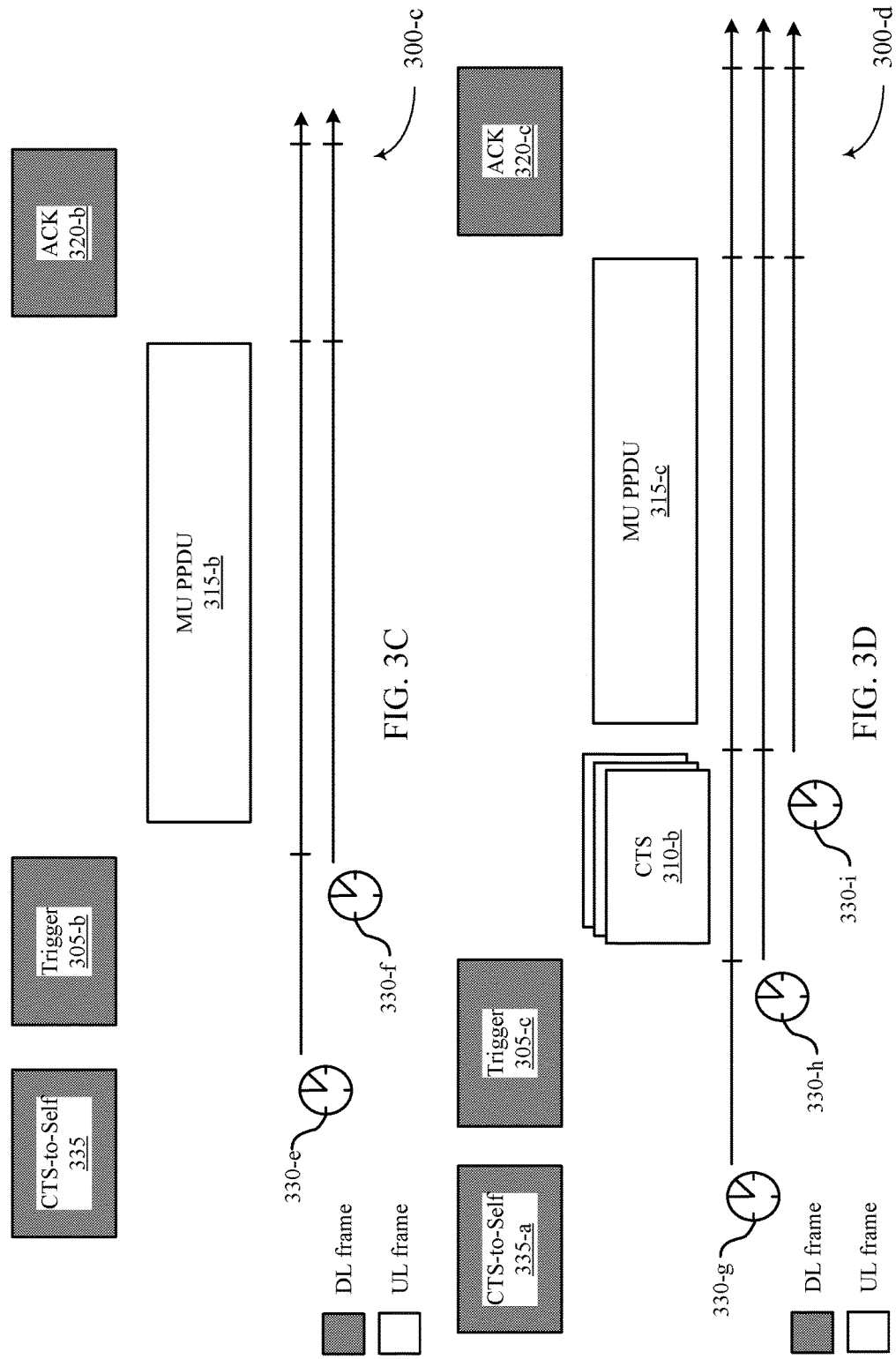

TECHNIQUES FOR PROTECTING COMMUNICATIONS IN WIRELESS LOCAL AREA NETWORKS

CROSS REFERENCES

The present Application for Patent claims priority to U.S. Provisional Patent Application No. 62/157,416 by Cherian, et al., entitled "Techniques for Protecting Communications in Wireless Local Area Networks," filed May 5, 2015, assigned to the assignee hereof.

BACKGROUND

Field of the Disclosure

The following relates generally to wireless communication, and more specifically to techniques for protecting communications in a Wireless Local Area Network (WLAN).

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). WLANs, such as Wi-Fi (IEEE 802.11) networks are widely deployed and used. Other examples of such multiple-access systems may include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of access points (APs), each simultaneously supporting communications for multiple mobile devices or stations (STAs), for example, in a particular WLAN. APs may communicate with STAs on downstream and upstream links. Each AP has a coverage range, which may be referred to as the coverage area of the cell. In a wireless local area network (WLAN), such as Wi-Fi, an AP may communicate with multiple STAs over a shared radio frequency spectrum. The STAs may use contention procedures, such as request to send/clear to send (RTS/CTS) messaging, to limit interference experienced by nearby communication devices. Contention procedures, such as RTS/CTS messaging, may in essence clear the communication path for a first device (e.g., a STA or AP) to transmit data to a second device. For example, prior to transmitting data to a second device, a STA, may first send a request to send (RTS) frame to the second device. The second device may respond to the RTS frame with a clear to send (CTS) frame clearing the STA to begin transmitting data to the second device.

Other devices may monitor the medium to determine if the channel is idle (e.g., using energy detection techniques). If a device determines that the channel is not idle (e.g., the energy level is above a threshold), the device may refrain from attempts to transmit for a pre-determined duration. In one example, a device may wait an extended interframe space interval (EIFS) before resuming attempts to transmit on the medium based on detecting the energy level of the channel is above the threshold. However, an EIFS may not be a sufficiently long duration to protect multi-user (MU) transmissions from multiple devices. Therefore, some devices may begin transmitting control or data frames that interfere with the MU transmissions. This may reduce the overall throughput and reliability of the wireless network.

SUMMARY

A network may employ additional contention based parameters to support MU transmissions and to communicate to other devices a duration that protects MU transmissions. For example, a first device may transmit a first message to reserve a subband of shared frequency spectrum band. The first message may be addressed to multiple devices and may indicate a channel access deferral duration to other devices within transmission range. The non-addressed devices may refrain from accessing the channel for an indicated duration. The addressed devices that receive the first message and respond to the first message with a second message, may also be used to reserve the channel. The second message may additionally be used to identify those devices that received the first message. The second message may provide redundant protection against those devices that missed the first message. The first device may receive and use the second message to generate a trigger message.

A method of wireless communication is described. The method may include transmitting a first message to a plurality of wireless devices to reserve a subband of a shared frequency spectrum band for at least an uplink transmission, receiving a second message from a wireless device of the plurality of wireless devices in response to the first message, the second message indicating the subband of the shared frequency spectrum band is reserved for the at least uplink transmission, identifying the wireless device based at least in part on the received second message, and receiving uplink data from the identified wireless device on the reserved subband of the shared frequency spectrum band.

An apparatus for wireless communication is described. The apparatus may include a transmitter for transmitting a first message to a plurality of wireless devices to reserve a subband of a shared frequency spectrum band for at least an uplink transmission, a channel monitor for receiving a second message from a wireless device of the plurality of wireless devices in response to the first message, the second message indicating the subband of the shared frequency spectrum band is reserved for the at least uplink transmission, a device identifier for identifying the wireless device based at least in part on the received second message, and a receiver for receiving uplink data from the identified wireless device on the reserved subband of the shared frequency spectrum band.

A further apparatus for wireless communication is described. The apparatus may include a processor, memory in electronic communication with the processor, and instructions stored in the memory and operable, when executed by the processor, to cause the apparatus to transmit a first message to a plurality of wireless devices to reserve a subband of a shared frequency spectrum band for at least an uplink transmission, receive a second message from a wireless device of the plurality of wireless devices in response to the first message, the second message indicating the subband of the shared frequency spectrum band is reserved for the at least uplink transmission, identify the wireless device based at least in part on the received second message, and receive uplink data from the identified wireless device on the reserved subband of the shared frequency spectrum band.

A non-transitory computer-readable medium storing code for wireless communication is described. The code may include instructions executable to transmit a first message to a plurality of wireless devices to reserve a subband of a shared frequency spectrum band for at least an uplink transmission, receive a second message from a wireless device of the plurality of wireless devices in response to the first message, the second message indicating the subband of the shared frequency spectrum band is reserved for the at least uplink transmission, identify the wireless device based at least in part on the received second message, and receive uplink data from the identified wireless device on the reserved subband of the shared frequency spectrum band.

Some examples of the method, apparatuses, or non-transitory computer-readable medium described herein may further include processes, features, means, or instructions for transmitting a trigger frame to the identified wireless device, the trigger frame indicating to the wireless device to transmit uplink data on the subband of the shared frequency spectrum band. Additionally or alternatively, in some examples the first message, or the second message, or the trigger frame, or a combination thereof comprise a duration field that indicates a duration that covers at least one subsequent uplink transmission.

In some examples of the method, apparatuses, or non-transitory computer-readable medium described herein, the first message, or the second message, or the trigger frame, or a combination thereof comprise a duration field that indicates a duration that covers at least one subsequent uplink transmission and at least one subsequent downlink acknowledgment message of the uplink data transmissions. Additionally or alternatively, in some examples the first message is addressed to the plurality of wireless devices and wherein the trigger frame is addressed to an identified subset of the plurality of wireless devices.

Some examples of the method, apparatuses, or non-transitory computer-readable medium described herein may further include processes, features, means, or instructions for allocating uplink resources to the identified subset of wireless devices. Additionally or alternatively, in some examples the trigger frame comprises a medium access control (MAC) trigger frame or a physical layer (PHY) trigger frame.

In some examples of the method, apparatuses, or non-transitory computer-readable medium described herein, the medium access control (MAC) trigger frame comprises a network allocation vector (NAV) field. Additionally or alternatively, in some examples the physical (PHY) trigger frame comprises a transmit opportunity (TXOP) field comprising a high efficiency signal field (HE-SIG) or a duplicate legacy signal field (L-SIG).

Some examples of the method, apparatuses, or non-transitory computer-readable medium described herein may further include processes, features, means, or instructions for allocating uplink resources to the identified wireless device based at least in part on receiving the second message from the wireless device. Additionally or alternatively, in some examples the transmitting the first message comprises transmitting a scrambler seed index on the subband of the shared frequency spectrum band.

In some examples of the method, apparatuses, or non-transitory computer-readable medium described herein, the receiving the second message comprises receiving a preassigned scrambler seed associated with the wireless device based at least in part on the scrambler seed index, and the identifying the wireless device is based at least in part on the received preassigned scrambler seed. Additionally or alternatively, in some examples the transmitting the first message comprises transmitting an uplink resource unit index on the subband of the shared frequency spectrum band.

In some examples of the method, apparatuses, or non-transitory computer-readable medium described herein, the second message is a frequency division multiplexed message that is based at least in part on the uplink resource unit index, and the identifying the wireless device is based at least in part on monitoring uplink resources associated with the wireless device. Additionally or alternatively, in some examples the transmitting the first message comprises transmitting an uplink channel index over a first subband of the shared frequency spectrum band, the receiving the second message comprises receiving the second message on a second subband of the share frequency spectrum band based at least in part on the uplink channel index, and the identifying the wireless device is based at least in part on monitoring the second subband of the shared frequency spectrum band.

In some examples of the method, apparatuses, or non-transitory computer-readable medium described herein, the first message comprises a multi-user (MU) request to send (RTS) frame and the second message comprises a clear to send (CTS) frame.

A method of wireless communication is described. The method may include receiving, from an access point, a first message that reserves a subband of a shared frequency spectrum band, transmitting a second message in response to the first message, wherein the second message indicates the subband of the shared frequency spectrum band is reserved and comprises identification information of the wireless device, and transmitting uplink data to the access pint on the subband of the shared frequency spectrum band.

An apparatus for wireless communication is described. The apparatus may include a receiver for receiving, from an access point, a first message that reserves a subband of a shared frequency spectrum band, an MU control unit for transmitting a second message in response to the first message, wherein the second message indicates the subband of the shared frequency spectrum band is reserved and comprises identification information of the wireless device, and a transmitter for transmitting uplink data to the access pint on the subband of the shared frequency spectrum band.

A further apparatus for wireless communication is described. The apparatus may include a processor, memory in electronic communication with the processor, and instructions stored in the memory and operable, when executed by the processor, to cause the apparatus to receive, from an access point, a first message that reserves a subband of a shared frequency spectrum band, transmit a second message in response to the first message, wherein the second message indicates the subband of the shared frequency spectrum band is reserved and comprises identification information of the wireless device, and transmit uplink data to the access pint on the subband of the shared frequency spectrum band.

A non-transitory computer-readable medium storing code for wireless communication is described. The code may include instructions executable to receive, from an access point, a first message that reserves a subband of a shared frequency spectrum band, transmit a second message in response to the first message, wherein the second message indicates the subband of the shared frequency spectrum band is reserved and comprises identification information of the wireless device, and transmit uplink data to the access pint on the subband of the shared frequency spectrum band.

Some examples of the method, apparatuses, or non-transitory computer-readable medium described herein may further include processes, features, means, or instructions for receiving a trigger frame from the access point to transmit uplink data on the subband of the shared frequency spectrum band. Additionally or alternatively, in some examples the first message, or the second message, or the trigger frame, or a combination thereof comprise a duration field that indicates a duration that covers at least the uplink data transmission.

In some examples of the method, apparatuses, or non-transitory computer-readable medium described herein, the first message, or the second message, or the trigger frame, or a combination thereof comprise a duration field that indicates a duration that covers at least the transmission of uplink data and a subsequent downlink transmission of an acknowledgment message of the uplink data transmission. Additionally or alternatively, some examples may include processes, features, means, or instructions for receiving an uplink resource allocation from the access point based at least in part on transmitting the second message to the access point.

In some examples of the method, apparatuses, or non-transitory computer-readable medium described herein, the receiving the first message comprises receiving a scrambler seed index on the subband of the shared frequency spectrum band. Additionally or alternatively, in some examples the transmitting the second message comprises transmitting a preassigned scrambler seed associated with the wireless device on the subband of the shared frequency spectrum band based at least in part on the scrambler seed index.

Some examples of the methods, apparatuses, or non-transitory computer-readable media described herein may further include processes, features, means, or instructions for protecting communications in a WLAN. Further scope of the applicability of the described systems, methods, apparatuses, or computer-readable media will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 3A-3D illustrate examples of a frame exchange for protecting communications in a WLAN in accordance with various aspects of the present disclosure;

DETAILED DESCRIPTION

Figure 1:
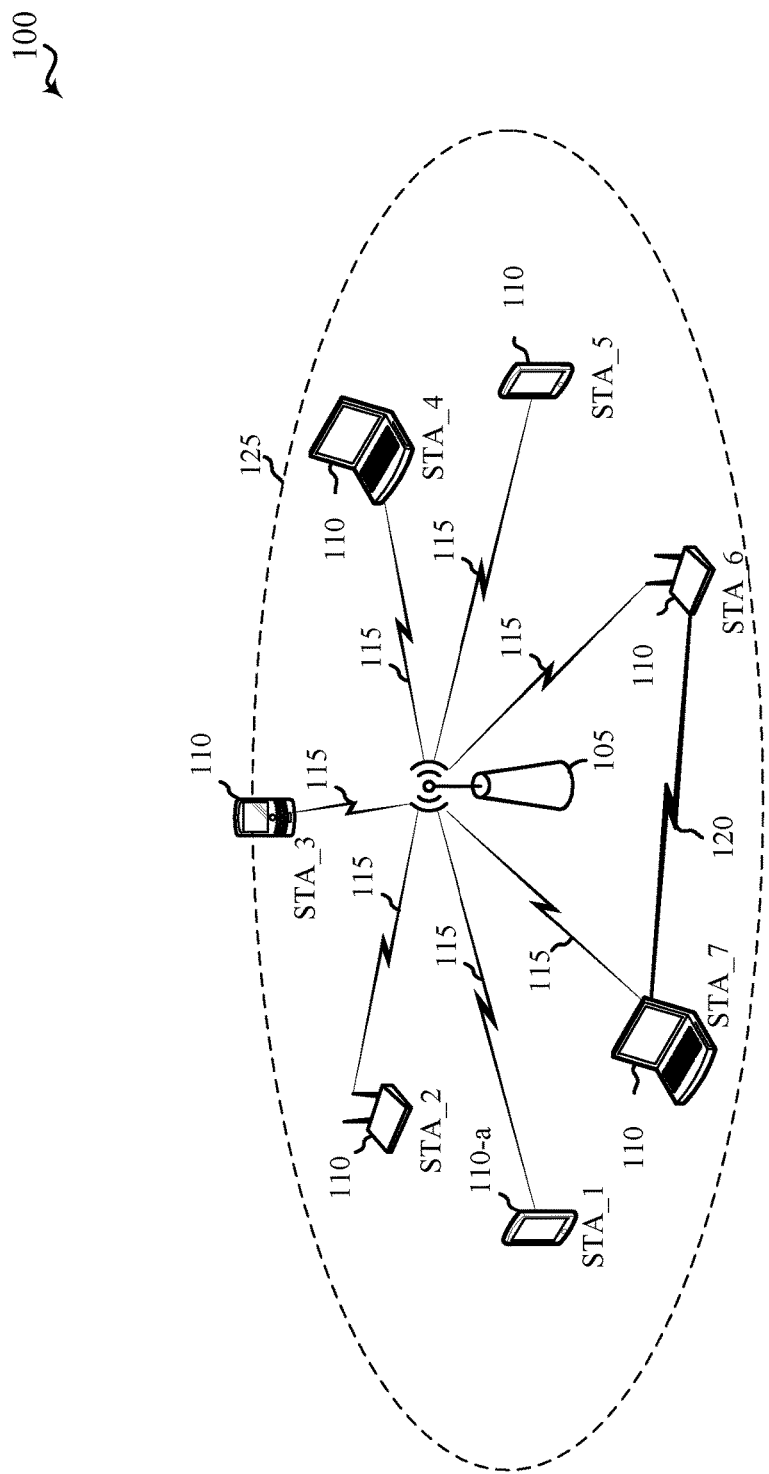
FIG. 1 illustrates an example of a network, such as a WLAN, for protecting communications in a WLAN in accordance with various aspects of the present disclosure.

According to the present disclosure, a network may employ additional contention based parameters to support multi-user (MU) transmissions and to communicate to other devices a duration that protects MU transmissions. Aspects of the disclosure are described in the context of a wireless communication system. For example, a network may use contention based protocols to protect uplink and downlink transmissions on a shared channel. Additional protocols may be utilized by the network to support MU transmissions.

In one example, a transmitting device may transmit a downlink control frame (e.g., MAC trigger frame, PHY trigger frame, MU-RTS, MU PPDU, etc.) that is addressed to MU capable devices. The downlink control frame may include protection mechanisms such as network allocation vector (NAV) protection, interframe space (IFS) protection, and transmission opportunity (TXOP) protection. The protection mechanisms may protect against unaddressed and non-MU capable devices. The receiving devices may transmit uplink control frames (e.g., clear to send (CTS) frames, null data units (NDUs), etc.) in response to the downlink control frame. The uplink control frames may similarly include protection mechanisms and may also be received or detected by unaddressed and non-MU capable devices. In some cases, the uplink control frames may be received by "hidden" devices that did not receive or detect the downlink control frame increasing the range of protection for subsequent transmissions. The uplink control frames may serve a second purpose of identifying the receiving device that sent the uplink control frame to the transmitting device. The uplink control frames may be transmitted using orthogonalization methods (e.g., scrambler seed indices, uplink resource allocation indices, uplink channel indices, etc.) to facilitate the identification of the corresponding devices. The receiving devices may transmit an MU data transmission (e.g., an MU packet layer convergence protocol (PLCP)-protocol data unit (PPDU)) following the uplink control frame. The transmitting device may use the received uplink control frames and MU data transmission to prepare an acknowledgement (ACK) response to the receiving devices.

In another example, the transmitting device may respond to the uplink control frame with a downlink trigger frame (e.g., MAC trigger frame, PHY trigger frame, MU-RTS, etc.) The transmitting device may generate the downlink trigger frame based on the received uplink control frame. For instance, the transmitting device may address the downlink trigger frame to those devices that responded to the downlink control frame. The transmitting device may, additionally or alternatively, re-allocate uplink resources based on the device that respond. The newly addressed devices may transmit an MU data transmission based on the downlink trigger frame and the transmitting device may use the received uplink control frames and MU data transmission to prepare an ACK report. These and other aspects of the disclosure are further illustrated by and described with reference to apparatus diagrams, system diagrams, and flowcharts.

FIG. 1 illustrates an example of a network, such as a wireless local area network (WLAN) 100, for protecting communications in a WLAN in accordance with various aspects of the present disclosure. The WLAN 100 may include an access point (AP) 105 and wireless stations (STAs 110) labeled as STA_1 through STA_7. The STAs 110 may include mobile handsets, personal digital assistants (PDAs), other handheld devices, netbooks, notebook computers, tablet computers, laptops, desktop computers, display devices (e.g., TVs, computer monitors, etc.), printers, etc. While only one AP 105 is illustrated, the WLAN 100 may have multiple APs 105. Each of the STAs 110, which may also be referred to as a wireless station (STA), a mobile station (MS), a mobile device, an access terminal (AT), a user equipment (UE), a subscriber station (SS), or a subscriber unit, may associate and communicate with an AP 105 via a communication link 115. Each AP 105 has a coverage area 125 such that STAs 110 within that area can typically communicate with the AP 105. The STAs 110 may be dispersed throughout the coverage area 125. Each STA 110 may be stationary or mobile.

Although not shown in FIG. 1, a STA 110 can be covered by more than one AP 105 and can therefore associate with multiple APs 105 at different times. A single AP 105 and an associated set of stations may be referred to as a basic service set (BSS). An extended service set (ESS) is a set of connected BSSs. A distribution system (DS) (not shown) is used to connect APs 105 in an extended service set. A coverage area 125 for an AP 105 may be divided into sectors making up only a portion of the coverage area (not shown). The WLAN 100 may include APs 105 of different types (e.g., metropolitan area, home network, etc.), with varying sizes of coverage areas and overlapping coverage areas for different technologies. Although not shown, other devices can communicate with the AP 105.

While the STAs 110 may communicate with each other through the AP 105 using communication links 115, each STA 110 may also communicate directly with other STAs 110 via a direct wireless communication link 120. Two or more STAs 110 may communicate via a direct wireless communication link 120 when both STAs 110 are in the AP coverage area 125, when one STA 110 is within the AP coverage area 125, or when neither of the STAs 110 are within the AP coverage area 125 (not shown). Examples of direct wireless communication links 120 may include Wi-Fi Direct connections, connections established by using a Wi-Fi Tunnel Direct Link Setup (TDLS) link, and other peer-to-peer (P2P) group connections. The STAs 110 and APs 105 in these examples may communicate according to the WLAN radio and baseband protocol including physical (PHY) and medium access control (MAC) layers from IEEE 802.11, and its various versions including, but not limited to, 802.11b, 802.11g, 802.11a, 802.11n, 802.11 ac, 802.11 ad, 802.11 ah, 802.11z, etc. In other implementations, other peer-to-peer connections or ad hoc networks may be implemented in WLAN 100.

In certain instances, WLAN 100 may implement a contention-based protocol that allows a number of devices (e.g., STAs 110 and APs 105) to share the same wireless medium (e.g., a channel) without pre-coordination. In a contention-based wireless system, devices may attempt to access a common channel in an unscheduled manner. To prevent several devices from transmitting over the channel at the same time and therefore interfering with one another, and to ensure certain quality of service (QoS) standards, each device in a BSS may operate according to certain procedures that structure and organize medium access. That is, each device may implement the same coordination techniques according to a common channel access protocol. For example, the devices of WLAN 100 may implement Enhanced Distributed Channel Access (EDCA) which defines channel access rules for a shared medium. Thus, the devices may each contend or compete for a medium according to the rules defined by EDCA.

Each device that implements EDCA may have associated EDCA parameters. The EDCA parameters may provide certain channel access restrictions that are specific to each wireless device. For example, interframe spacing (IFS) parameters for a device may dictate how long a device may wait after a frame to communicate. For example, a short interframe space (SIFS) may be the shortest duration a device may wait between receiving and transmitting data. A SIFS may correspond to the time period between a received transmission and an acknowledgement response. One example of an IFS is the distributed coordination function (DCF) interframe spacing (DIFS). The DIFS duration may specify how long a channel must be free of traffic (idle) before a device enters a backoff period. After waiting the backoff period, which in some cases may be skipped (i.e., 0 seconds), a device may begin transmitting over the medium. The DIFS duration may be longer than a SIFS and may correspond to a duration during which a device monitors the channel before entering random backoff or transmitting.

Devices with QoS requirements may observe differing IFS, called arbitration IFS (AIFS) based on the type of communication in which the device intends to engage. In some cases, the EDCA parameters for a device may be based on the priority (access category) of the device. The access category for a device may be dynamically determined, and may be based on the type of traffic the device wishes to communicate. The AIFS may be determined based on data type and may be based on the SIFS and/or an AIFS-number (AIFSN), which indicates a number of time slots. A device may dynamically determine the AIFSN. An extended IFS (EIFS) may be determined based on a SIFS, an ACK duration, and a DIFS. A device may wait an EIFS before transmitting if the STA detects a data frame over the channel but fails to decode the frame. The EIFS may be used to mitigate the "hidden node problem" in which a device fails to detect a transmission from another device and sends an interfering transmission over the medium.

As described above, devices in a contention-based channel access system may share a single channel for transmissions. The channel may be a half-duplex channel in which one device may transmit at a time (i.e., traffic may flow in one of two directions at a time). Collisions may occur when two or more devices attempt to access the channel at the same time. When a collision occurs, a device that does not currently own the channel may experience a transmission failure. To reduce collisions, devices may attempt to access the channel according to the IFS parameters to which the device are assigned. In an example of an EDCA frame exchange, a first device, such as a STA 110-a, may contend for the channel when the STA 110-a has data ready to send. To avoid a collision, the STA 110-a may determine if the channel is available (e.g., the STA 110-a may utilize carrier sense multiple access with collision avoidance (CSMA/CA)) before transmitting. The STA 110-a may continuously monitor the channel for a DIFS duration. If the STA 110-a determines the channel is idle for the full DIFS duration the STA 110-a may transmit a data frame, such as a multi-user (MU) protocol layer convergence protocol (PLCP) packet data unit (PDU), or control frame, (e.g., an RTS frame) over the channel to a second device, such as an AP 105. Other STAs 110 within the coverage area 125 may detect the transmission and enter an additional IFS duration.

In some cases, the RTS frame may include a network allocation vector (NAV) that includes a duration field. The duration field may be decoded by the other STAs 110 and indicates a duration for which the other STAs 110 may defer from accessing the channel. In some cases the duration may extend through a subsequent clear to send (CTS) frame, data transmission, and ACK frame. Some STAs 110 may fail to decode the duration field of the RTS and enter an EIFS period. The AP 105 may respond to the STA 110-a with a CTS frame, which may similarly include a duration field. In some cases, STAs 110 that failed to decode the RTS may successful decode the CTS and duration field. Some STAs 110 may additionally fail to decode the CTS and enter an additional EIFS period. STA 110-a may receive the CTS and transmit data to the AP 105. The STAs 110 that successfully decoded the CTS may defer from accessing the channel through the remainder of the data transmission, while the STAs 110 that did not may detect the data transmission and enter into another EIFS period. After the STA 110-a has finished transmitting data, the AP 105 may wait a SIFS period before transmitting an ACK frame to STA 110-a, which the other STAs 110 may decode and enter into a DIFS period.

A NAV may be associated with a MAC frame and is one example of a channel protection technique. Other examples, include transmission opportunity (TXOP) protection which may be associated with a PHY frame. For instance, the legacy signal (L-SIG) field of a PHY frame may designate a data rate and length that indicate a duration that is longer than the actual frame duration. Therefore, STAs 110 that decode the L-SIG field may refrain from accessing the channel for a period that extends past a first transmission.

In some cases, the EDCA mechanisms mentioned above may not support multi-user frame exchanges. For instance, a device, such as an AP 105, may transmit a control frame to multiple STAs 110 instructing the STAs 110 to transmit a subsequent MU data frame. In some cases, a non-multi-user capable device may fail to decode the control frame and may enter an EIFS period. After the EIFS expires, the device may fail to detect the MU transmissions and may contend for channel access, thereby interfering with the MU transmissions. This may reduce the overall throughput and reliability of the wireless network.

Accordingly, a network may employ additional contention based parameters to support MU transmissions and to communicate to non-multi-user capable devices a duration that protects MU operation. For example, a device, such as an AP 105, may transmit a first message to reserve a subband of shared spectrum. The first message may be addressed to multiple STAs 110, and the addressed STAs 110 may each respond to the first message with a second message. The non-addressed STAs 110 may receive the first message and defer from accessing the channel for an indicated duration. The second messages may also be used to reserve the channel for an indicated duration, and additionally, may identify the STA 110 associated with the message to the AP 105. In some cases, the second messages may be received by unaddressed STAs 110 that missed the first message. This may reduce the number of STAs 110 that may attempt to access the medium.

Figure 2:
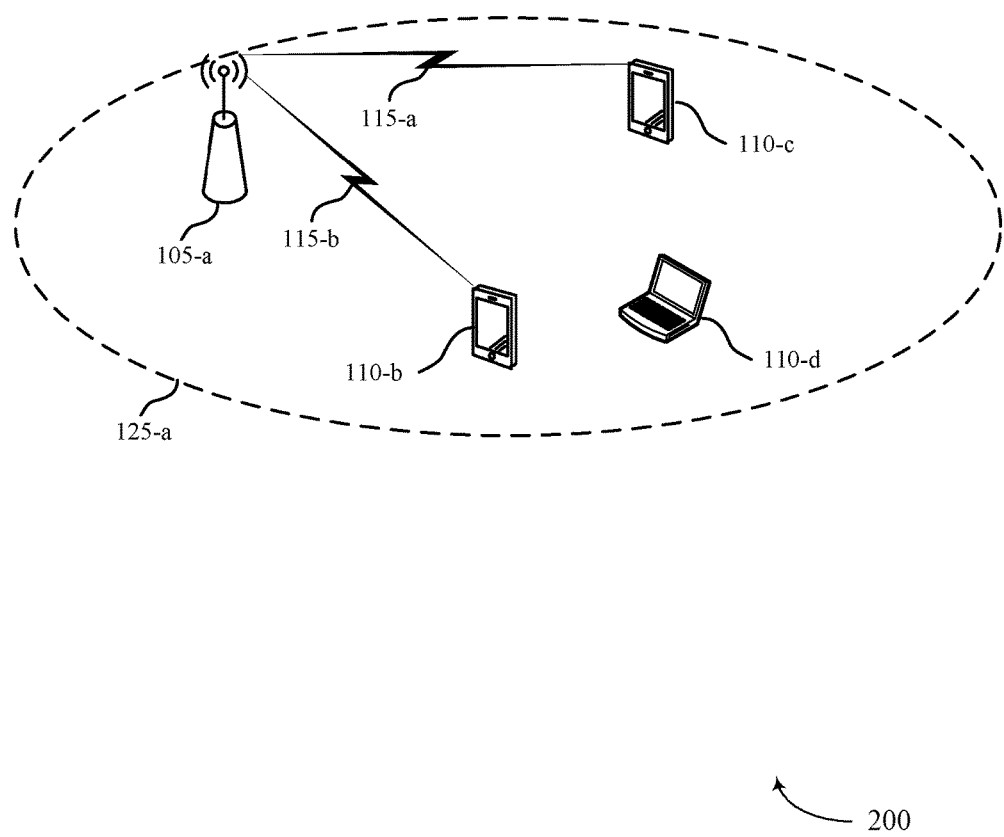
FIG. 2 illustrates an example of a wireless communications subsystem for protecting communications in a WLAN in accordance with various aspects of the present disclosure.

FIG. 2 illustrates an example of a wireless communications subsystem 200 for protecting communications in a WLAN in accordance with various aspects of the present disclosure. Wireless communications subsystem 200 may include STA 110-b, STA 110-c, STA 110-d, and AP 105-a, which may be examples of a STA 110 or an AP 105 described above with reference to FIG. 1. AP 105-a, STAs 110-b, 110-c, and 110-d may communicate with one another via communication links 115 when a STA 110 is within coverage area 125-a. AP 105-a, STA 110-b and STA 110-c may be multi-user (MU) capable devices while STA 110-d may not support MU operation. For the sake of clarity, STA 110-d may be referred to as a standard device, while AP 105-a, STA 110-b, and STA 110-c may be referred to as enhanced devices.

STA 110-b, STA 110-c, and STA 110-d may contend for access to the channel using contention protocols, such as EDCA mentioned above. In some cases, AP 105-a may determine that a number of enhanced STAs 110, including STA 110-b and STA 110-c, have uplink data to transmit. Accordingly, the AP 105-a may schedule the enhanced STAs 110 for an MU uplink transmission (e.g., an MU PPDU) in a downlink control frame (e.g., a trigger frame, MU-RTS frame, etc.). The downlink control frame may, additionally, instruct standard STAs 110, such as STA 110-d, and non-scheduled enhanced STAs 110 to defer from accessing the channel for a first duration that extends through the subsequent MU data transmission and/or a downlink acknowledgement frame. STA 110-b and STA 110-c may respond to the control frame with an uplink control frame (e.g., CTS frame, null data unit (NDU), MU PPDU etc.) that serves the dual-purpose of reserving the channel and identifying the STA 110 that sent the control frame to AP 105-a. Standard STAs 110, such as STA 110-d, may also receive the uplink control frame and determine a second channel access deferral duration. In some cases, standard and enhanced STAs 110 that missed the downlink control frame may receive or detect the uplink control frame and defer from channel access. The uplink control frames may be transmitted by STA 110-b and STA 110-c using orthogonalization methods. The orthogonalization methods may be used to differentiate CTSs transmitted from different STAs 110, and AP 105-a may use these methods to correlate STA 110-b and STA 110-c with their respective uplink control frames.

In one example, AP 105-a may respond to the uplink control frame with a downlink trigger frame. The downlink trigger frame may be generated based on the STAs 110 identified in the uplink control frame and may be used to reserve the channel and/or allocate uplink resources. For instance, the downlink trigger frame may be modified to address identified STA 110-b and STA 110-c and to inform other enhanced STAs 110 to defer from accessing the channel. Additionally or alternatively, AP 105-a may allocate resources for the subsequent uplink transmission (e.g., MU PPDU) to STA 110-b and STA 110-c based on identifying which of the enhanced STAs 110 responded to the downlink control frame. STA 110-b and STA 110-c may transmit the uplink transmission following the downlink trigger frame, to which AP 105-a may respond with an ACK frame (e.g., MU block ACK (B-ACK), MU OFDM B-ACK, etc.). In another example, AP 105-a may refrain from sending the downlink trigger frame and STA 110-b and STA 110-c may transmit the uplink transmission immediately following the uplink control frame. AP 105-a may then respond to the uplink transmission with an ACK frame.

FIG. 3A illustrates an example of a frame exchange 300-a for protecting communications in a WLAN in accordance with various aspects of the present disclosure. Frame exchange 300-a may illustrate aspects of a transmission between multiple STAs 110 and an AP 105, as described above with reference to FIGS. 1-2. Frame exchange 300-a may include trigger frame 305, CTS frames 310, MU PPDU 315, and ACK frame 320.

In one example, an AP 105 may determine that a selected set of STAs 110 are due to transmit uplink data. The AP 105 may transmit a trigger frame 305 addressed to the set of STAs 110 over a shared channel. The trigger frame 305 may include protection mechanisms (e.g., NAV, TXOP, EIFS) to prevent other STAs 110, enhanced and standard, from transmitting over the channel for a duration 330 that includes at least one subsequent transmission, (e.g., CTS frames 310, MU PPDU 315, and ACK frame 320) associated with frame exchange 300-a. The trigger frame 305 may, additionally, include signaling to support the orthogonalization methods described below. The enhanced STAs 110 that receive trigger frame 305 may each respond with a CTS frame 310. In some cases, the STAs 110 may transmit the CTS frames 310 using orthogonalization methods (described below) to provide identification information for each STA 110 to the AP 105. The CTS frames 310 may also utilize protection mechanisms to reserve the channel for another duration 330-a that includes at least one subsequent transmission. This may provide protection against "hidden" enhanced or standard STAs 110 that failed to detect or decode trigger frame 305. In some cases, the STAs 110 may transmit uplink MU PPDU 315 immediately following CTS frames 310. The AP 105 may receive CTS frames 310 and MU PPDU 315 and determine what data in MU PPDU 315 belongs to which transmitting STAs 110 based on the utilized orthogonalization method. The AP 105 may then generate multi-user ACK frame 320 based on the received MU PPDU 315 and CTS frames 310.

One orthogonalization technique may include sending a scrambler seed index. For instance, the AP 105 may transmit a trigger frame 305 (e.g., a MAC trigger frame, a PHY trigger frame, an MU-RTS frame, etc.) including a scrambler seed index. The STAs 110 that receive the scrambler seed index may use the index to generate and transmit unique CTS frames 310 associated with a pre-assigned scrambler seed. In some cases, the CTS frames 310 may be transmitted using a 20 MHz bandwidth channel, or duplicated across multiple 20 MHz channel if an enhanced STA 110 has been allocated more than 20 MHz. The CTS frames 310 may be detectable and/or decodable by both standard and enhanced STAs 110 and may instruct these STAs 110 to refrain from accessing the channel for a given duration. AP 105 may receive and separate the CTS frames 310 based on the received scrambler seeds to determine which CTS frame 310 corresponds to which enhanced STAs 110.

Another orthogonalization technique may include sending an uplink resource unit index. For instance, the AP 105 may transmit a trigger frame 305 including an uplink resource unit index. The STAs 110 that receive the uplink resource unit index may each determine an uplink resource allocation. In some cases, each allocated uplink resource unit may be assigned an index based on the order in which a STA 110 appears in the trigger frame 305. The STAs 110 may then transmit a CTS frame 310 using the allocated uplink resources. Other STAs may detect or decode the CTS frames 310 and refrain from accessing the channel for a given duration. The CTS frame 310 may be sent as a multi-user PPDU and may include a preamble that is decodable to standard STAs 110. In some cases, the STAs 110 may transmit CTS frame 310 using the lowest modulation and coding scheme (MCS) index value to reduce sensitivity to power control. The AP 105 may then determine which STAs 110 transmitted data in subsequent MU PPDU 315 based on identifying which uplink resources are occupied.

Yet another orthogonalization technique may include sending an uplink channel index. For instance, the AP 105 may transmit a trigger frame 305 including an uplink resource unit index. The STAs 110 that receive the uplink channel index may each determine a dedicated channel bandwidth for transmitting one of CTS frames 310. For instance, the uplink channel index may allocate 20 MHz bandwidths to each receiving STA 110, and the STAs 110 may each transmit a CTS frame 310 using the allocated bandwidth. The CTS frames 310 receive address (RA) field may include the transmitting STAs 110 MAC address. In some cases, the AP 105 may send trigger frame 305 to STAs 110 near the edge of the coverage area. This may increase the number of STAs 110 that detect or decode the subsequent CTS frames 310 and provide enhanced protection. The AP 105 may then determine which STAs 110 transmitted data in MU PPDU 315 based on identifying which channel bandwidths are utilized.

FIG. 3B illustrates an example of a frame exchange 300-b for protecting communications in a WLAN in accordance with various aspects of the present disclosure. Frame exchange 300-b may illustrate aspects of a transmission between multiple STAs 110 and an AP 105, as described above with reference to FIGS. 1-3A. Frame exchange 300-b may include trigger frame 305-a, CTS frames 310-a, MU PPDU 315-a, ACK frame 320-a, and MU-RTS frame 325.

In one example, an AP 105 may determine that a selected set of STAs 110 are due to transmit uplink data. The AP 105 may transmit a trigger frame, such as MU-RTS frame 325 that is addressed to the set of STAs 110 over a shared channel. The MU-RTS frame 325 may include protection mechanisms (e.g., NAV, TXOP, EIFS) to prevent other STAs 110, enhanced and standard, from transmitting over the channel for a duration 330-b that includes at least one subsequent transmission associated with frame exchange 300-a. The MU-RTS frame 325 may, additionally, include signaling (e.g., a scrambler seed index, uplink resource unit index, or uplink channel index) supporting any of the above described orthogonalization methods. The enhanced STAs 110 that receive MU-RTS frame 325 may respond with CTS frames 310. In some cases, the STAs 110 may transmit the CTS frames 310 using orthogonalization methods based on the received MU-RTS frame 325. The CTS frames 310 may also utilize protection mechanisms to reserve the channel for another duration 330-c that includes at least one subsequent transmission. In some cases, the AP 105 may transmit a trigger frame 305-a in response to the received CTS frames 310-a. The AP 105-a may modify trigger frame 305-a based on the received CTS frames 310-a. For instance, trigger frame 305-a may be modified to address only the STAs 110 that transmitted CTS frames 310-a. The AP 105 may additionally modify an original resource allocation based on the received CTS frames 310-a. For instance, if a subset of the selected set of STAs 110 responded to MU-RTS frame 325, AP 105 may address the trigger frame to the subset of STAs 110. AP 105 may additionally re-allocate uplink resources to the responding STAs 110, or may allocate resources that were intended for STAs 110 that did not respond to random uplink MU access. In some cases, the AP 105 may address the MU-RTS frame 325 to a subset of the selected STAs 110 based on a STAs 110 distance from the AP 105. The trigger frame 305-a may be transmitting during a duration 330-c. The STAs 110 addressed in trigger frame 305-a may transmit subsequent uplink MU PPDU 315-a. The MU PPDU 315-a may utilize protection mechanisms to reserve the channel for another duration 330-*d* that includes at least one subsequent transmission The AP 105 may receive the MU PPDU 315-*a* and may generate multi-user ACK 320-*a* based on the received MU PPDU 315-*a* and CTS frames 310-*a*.

FIG. 3C illustrates an example of a frame exchange 300-*c* for protecting communications in a WLAN in accordance with various aspects of the present disclosure. Frame exchange 300-*c* may illustrate aspects of a transmission between multiple STAs 110 and an AP 105, as described above with reference to FIGS. 1-3B. Frame exchange 300-*c* may include trigger frame 305-*b*, MU PPDU 315-*b*, ACK frame 320-*b*, and CTS-to-Self frame 335.

In one example, an AP 105 may determine that a selected set of STAs 110 are due to transmit uplink data. The AP 105 may transmit CTS-to-Self frame 335 including a duration field over the shared channel. The standard and enhanced STAs 110 that decode the CTS-to-Self frame 335 may refrain for accessing the channel for a time period associated with the duration field while STAs 110 that detect, but do not decode, the CTS-to-Self frame 335 may enter an EIFS period. The duration field may allocate a duration 330-*e* that protects at least one of the following transmission associated with frame exchange 300-*c*. The AP 105 may follow the CTS-to-Self frame 335 with a trigger frame 305-*b*. Trigger frame 305-*b* may be addressed to STAs 110 and may act as an implicit contention free end for those STAs 110. Trigger frame 305-*b* may include a resource allocation to the addressed STAs 110 for subsequent MU PPDU 315-*b*. If the trigger frame 305-*b* marks the beginning of an MU random access period, the trigger frame 305-*b* may mark an implicit contention free end for any STA 110 that receives trigger frame 305-*b*. Trigger frame 305-*b* may additionally include mechanisms to protect at least one subsequent transmission. The STAs 110 that successfully receive trigger frame 305-*b* may transmit MU PPDU 315-*b* based on the received trigger frame 305-*b*. The AP 105 may receive the MU PPDU 315-*b* and may generate multi-user ACK 320-*a* based on the received MU PPDU 315-*b*. The MU PPDU 315-*b* may utilize protection mechanisms to reserve the channel for another duration 330-*f* that includes at least one subsequent transmission.

FIG. 3D illustrates an example of a frame exchange 300-*d* for protecting communications in a WLAN in accordance with various aspects of the present disclosure. Frame exchange 300-*d* may illustrate aspects of a transmission between multiple STAs 110 and an AP 105, as described above with reference to FIGS. 1-3C. Frame exchange 300-*d* may include trigger frame 305-*c*, CTS frame 310-*b*, MU PPDU 315-*c*, ACK frame 320-*c*, and CTS-to-Self frame 335-*a*.

In one example, an AP 105 may determine that a selected set of STAs 110 are due to transmit uplink data. The AP 105 may transmit CTS-to-Self frame 335-*a* over the shared channel during a duration. The STAs 110 that receive the CTS-to-Self frame 335-*a* may refrain for a given duration 330-*g* that protects at least one of the following transmission associated with frame exchange 300-*d*. Frame exchange 300-*d* between the AP 105 and STA 110 may then proceed as described above with reference to FIG. 3A. For example, the AP 105 may transmit a trigger frame 305-*c* addressed to the set of STAs 110 over a shared channel. The trigger frame 305-*c* may include protection mechanisms (e.g., NAV, TXOP, EIFS) to prevent other STAs 110, enhanced and standard, from transmitting over the channel for a duration 330-*h* that includes at least one subsequent transmission, (e.g., CTS frames 310-*b*, MU PPDU 315-*c*, and ACK frame 320-*c*) associated with frame exchange 300-*d*. The CTS frames 310-*b* may also utilize protection mechanisms to reserve the channel for another duration 330-*i* that includes at least one subsequent transmission. This may provide protection against "hidden" enhanced or standard STAs 110 that failed to detect or decode trigger frame 305-*c*. In some cases, the STAs 110 may transmit uplink MU PPDU 315-*c* immediately following CTS frames 310-*b*. The AP 105 may receive CTS frames 310-*b* and MU PPDU 315-*c* and determine what data in MU PPDU 315-*c* belongs to which transmitting STAs 110 based on the utilized orthogonalization method. The AP 105 may then generate multi-user ACK frame 320-*c* based on the received MU PPDU 315-*c* and CTS frames 310-*b*.

Figure 4A:
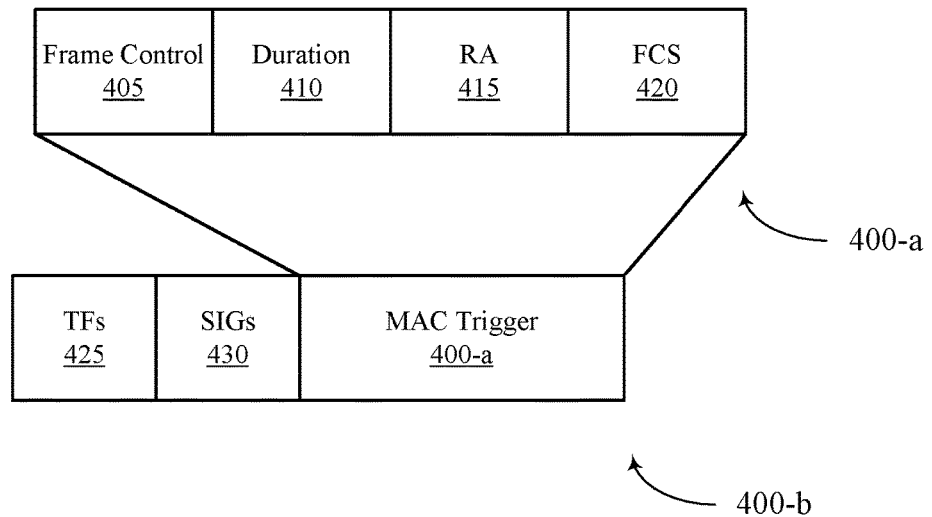
FIGS. 4A-4B illustrate examples of trigger frames for protecting communications in a WLAN in accordance with various aspects of the present disclosure.

FIG. 4A illustrates an example of MAC trigger frame 400-*a* and PHY trigger frame 400-*b* for protecting communications in a WLAN in accordance with various aspects of the present disclosure. MAC trigger frame 400-*a* and PHY trigger frame 400-*b* may be used during transmissions between multiple STAs 110 and an AP 105 as described above with reference to FIGS. 1-3D, and may be example of a trigger frame 305, as described above with reference to FIGS. 3A-3D. MAC trigger frame 400-*a* may include frame control field 405, duration field 410, receiver address (RA) 415, and frame check sequence (FCS) 420. MAC trigger frame 400-*a* may include NAV protection by means of duration field 410. STAs 110 that receive and decode MAC trigger frame 400-*a* may use the duration field 410 to determine a time period to refrain from accessing a shared channel.

MAC trigger frame 400-*a* may be encapsulated within a PHY trigger frame 400-*b*. PHY trigger frame 400-*b* may include training fields 425, signal fields 430, and MAC trigger frame 400-*a*. STAs 110 that receive PHY trigger frame 400-*b* but do not successfully decode MAC trigger frame 400-*a* may enter an EIFS period, during which the STAs 110 refrain from accessing the shared channel. In some cases, PHY trigger frame 400-*b* may additionally include TXOP protection within the SIG fields. For instance, the SIGs field may include a legacy SIG (L-SIG) field that indicates a TXOP duration that is greater than the duration of PHY trigger frame 400-*a*. The L-SIG field may be detectable by both standard and enhanced STAs 110 alike. In another example, PHY trigger frame 400-*b* may indicate TXOP protection within a duplicate L-SIG field, or using a high efficiency (HE-SIG) field that is detectable by enhanced STAs 110.

Figure 4B:
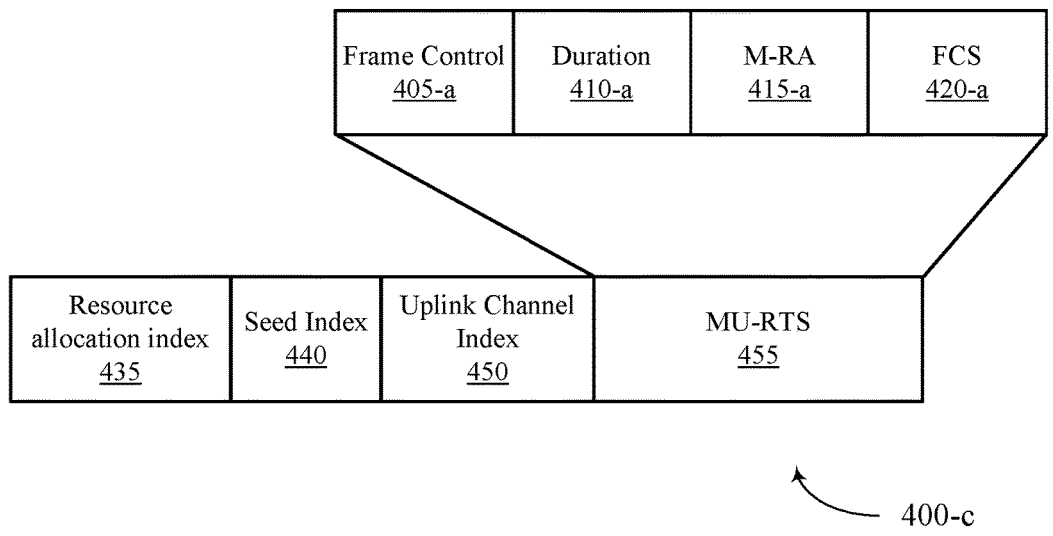

FIG. 4B illustrates an example of an MU-RTS trigger frame 400-*c* for protecting communications in a WLAN in accordance with various aspects of the present disclosure. MU-RTS trigger frame 400-*c* may be used during transmissions between multiple STAs 110 and an AP 105, as described above with reference to FIGS. 1-4A. MU-RTS trigger frame 400-*c* may include resource allocation index 435, seed index 440, uplink channel index 450, and MU-RTS 455. In one example, MU-RTS 455 may include a frame control field 405-*a*, duration field 410-*a*, multiple RA (M-RA) field 415-*a*, and an FCS field 420-*a*.

Unaddressed STAs 110 that receive and decode MU-RTS trigger frame 400-*c* may use the duration field 410-*a* to determine a duration to refrain from channel access attempts, while STAs 110 that are addressed using the M-RA field 415-*a* may respond to the MU-RTS with a CTS frame. The addressed STAs 110 that receive the MU-RTS 455 may transmit a CTS based on the resource allocation index 435, seed index 440, and uplink channel index 450 using orthogonalization methods described above in FIGS. 3A-3D.

Figure 5:
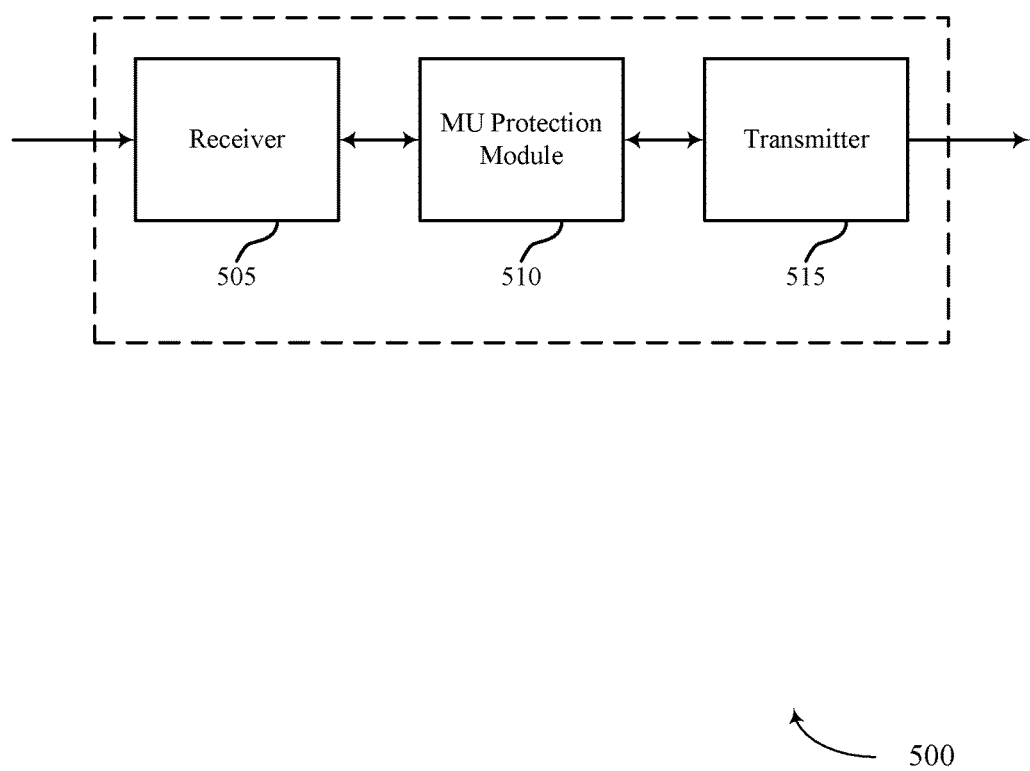
FIGS. 5-7 show block diagrams of a wireless device that supports techniques for protecting communications in WLAN in accordance with various aspects of the present disclosure.

FIG. 5 shows a block diagram of a wireless device 500 configured for techniques for protecting communications in WLAN in accordance with various aspects of the present disclosure. Wireless device 500 may be an example of aspects of a STA 110 or an AP 105 described with reference to FIGS. 1-4. Wireless device 500 may include a receiver 505, an MU protection module 510, and a transmitter 515. Wireless device 500 may also include a processor. Each of these components may be in communication with each other.

The receiver 505 may receive information such as packets, user data, or control information associated with various information channels (e.g., control channels, data channels, and information related to techniques for protecting communications in WLAN, etc.). Information may be passed on to the MU protection module 510, and to other components of wireless device 500. In some examples, an access point, such as AP 105, may use the receiver 505 to receive a second message from a wireless device of the plurality of wireless devices in response to the first message, the second message indicating the subband of the shared frequency spectrum band is reserved for the at least one uplink transmission. In some cases, receiver 505 may receive uplink data from an identified wireless device on the reserved subband of the shared frequency spectrum band. In some examples, receiving the second message comprises receiving a preassigned scrambler seed associated with the wireless device based at least in part on the scrambler seed index. In some examples, the second message is a frequency division multiplexed message that is based at least in part on the uplink resource unit index. In some examples, receiving the second message comprises receiving the second message on a second subband of the shared frequency spectrum band based at least in part on the uplink channel index. In some examples, a wireless device, such as a STA 110, may use the receiver 505 to receive, from an access point, a first message that reserves a subband of a shared frequency spectrum band. In some examples, the receiver 505 may receive a trigger frame from the access point to transmit uplink data on the subband of the shared frequency spectrum band.

The MU protection module 510 may transmit a first message to a plurality of wireless devices to reserve a subband of a shared frequency spectrum band for at least one uplink transmission, receive a second message from a wireless device of the plurality of wireless devices in response to the first message, the second message indicating the subband of the shared frequency spectrum band is reserved for the at least one uplink transmission, identify the wireless device based at least in part on the received second message, and receive uplink data from the identified wireless device on the reserved subband of the shared frequency spectrum band.

The transmitter 515 may transmit signals received from other components of wireless device 500. In some examples, the transmitter 515 may be collocated with the receiver 505 in a transceiver module. The transmitter 515 may include a single antenna, or it may include a plurality of antennas. In some examples, an access point, such as AP 105, may use the transmitter 515 to transmit a first message to a plurality of wireless devices to reserve a subband of a shared frequency spectrum band for at least one uplink transmission. In some examples, the transmitter 515 may transmit a trigger frame to the identified wireless device, the trigger frame indicating to the wireless device to transmit uplink data on the subband of the shared frequency spectrum band. In some examples, a wireless device, such as STA 110, may use the transmitter 515 to transmit uplink data to the access point on the subband of the shared frequency spectrum band. In some examples, transmitting the second message comprises transmitting a preassigned scrambler seed associated with the wireless device on the subband of the shared frequency spectrum band based at least in part on the scrambler seed index.

Figure 6:
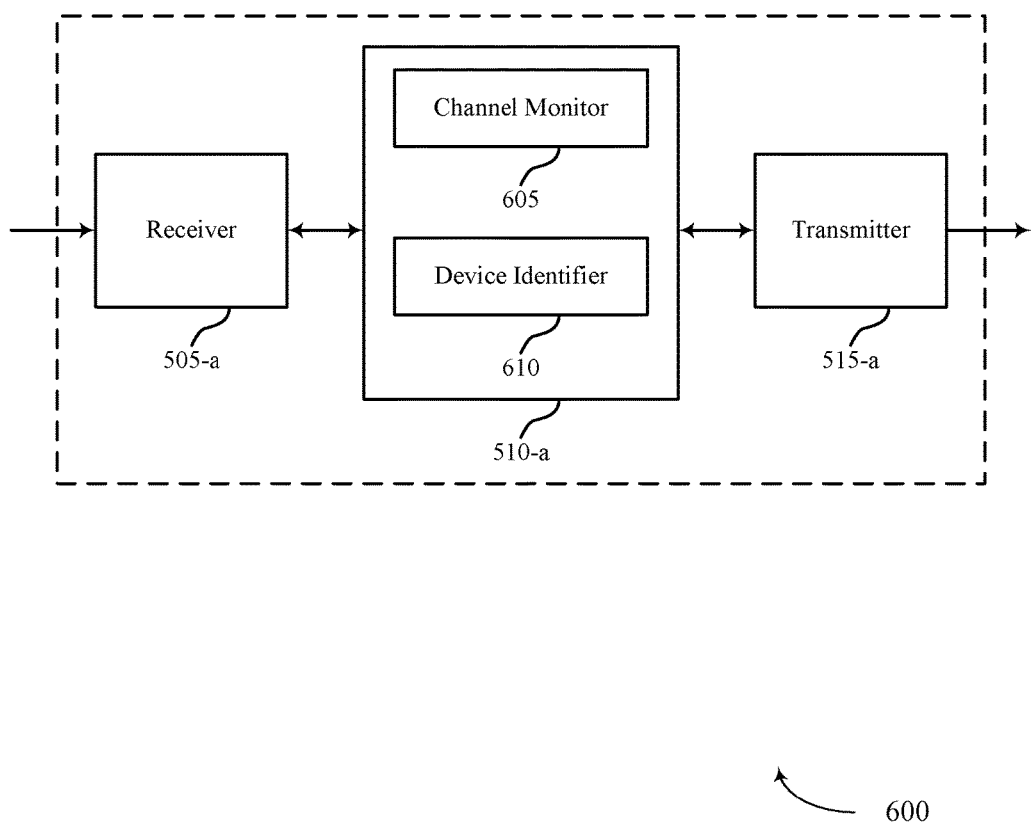

FIG. 6 shows a block diagram of a wireless device 600 for implementing techniques for protecting communications in WLAN in accordance with various aspects of the present disclosure. Wireless device 600 may be an example of aspects of a wireless device 500, STA 110, or AP 105 described with reference to FIGS. 1-5. Wireless device 600 may include a receiver 505-a, an MU protection module 510-a, and a transmitter 515-a. Wireless device 600 may also include a processor. Each of these components may be in communication with each other. The MU protection module 510-a may also include a channel monitor 605, and a device identifier 610.

The receiver 505-a may receive information which may be passed on to MU protection module 510-a, and to other components of wireless device 600. The MU protection module 510-a may perform the operations described with reference to FIG. 5. The transmitter 515-a may transmit signals received from other components of wireless device 600.

The channel monitor 605 may receive a second message from a wireless device of the plurality of wireless devices in response to the first message, the second message indicating the subband of the shared frequency spectrum band is reserved for the at least one uplink transmission as described with reference to FIGS. 2-4. In some examples, the first message, or the second message, or the trigger frame, or a combination thereof comprise a duration field that indicates a duration that covers at least the uplink data transmission. In some examples, the first message, or the second message, or the trigger frame, or a combination thereof comprise a duration field that indicates a duration that covers at least the uplink data transmission and a subsequent downlink transmission of an acknowledgment message of the uplink data transmission.

The device identifier 610 may identify the wireless device based at least in part on the received second message as described with reference to FIGS. 2-4. In some examples, identifying the wireless device may be based at least in part on the received preassigned scrambler seed. In some examples, identifying the wireless device may be based at least in part on monitoring uplink resources associated with the wireless device. In some examples, identifying the wireless device may be based at least in part on monitoring the second subband of the shared frequency spectrum band.

Figure 7:
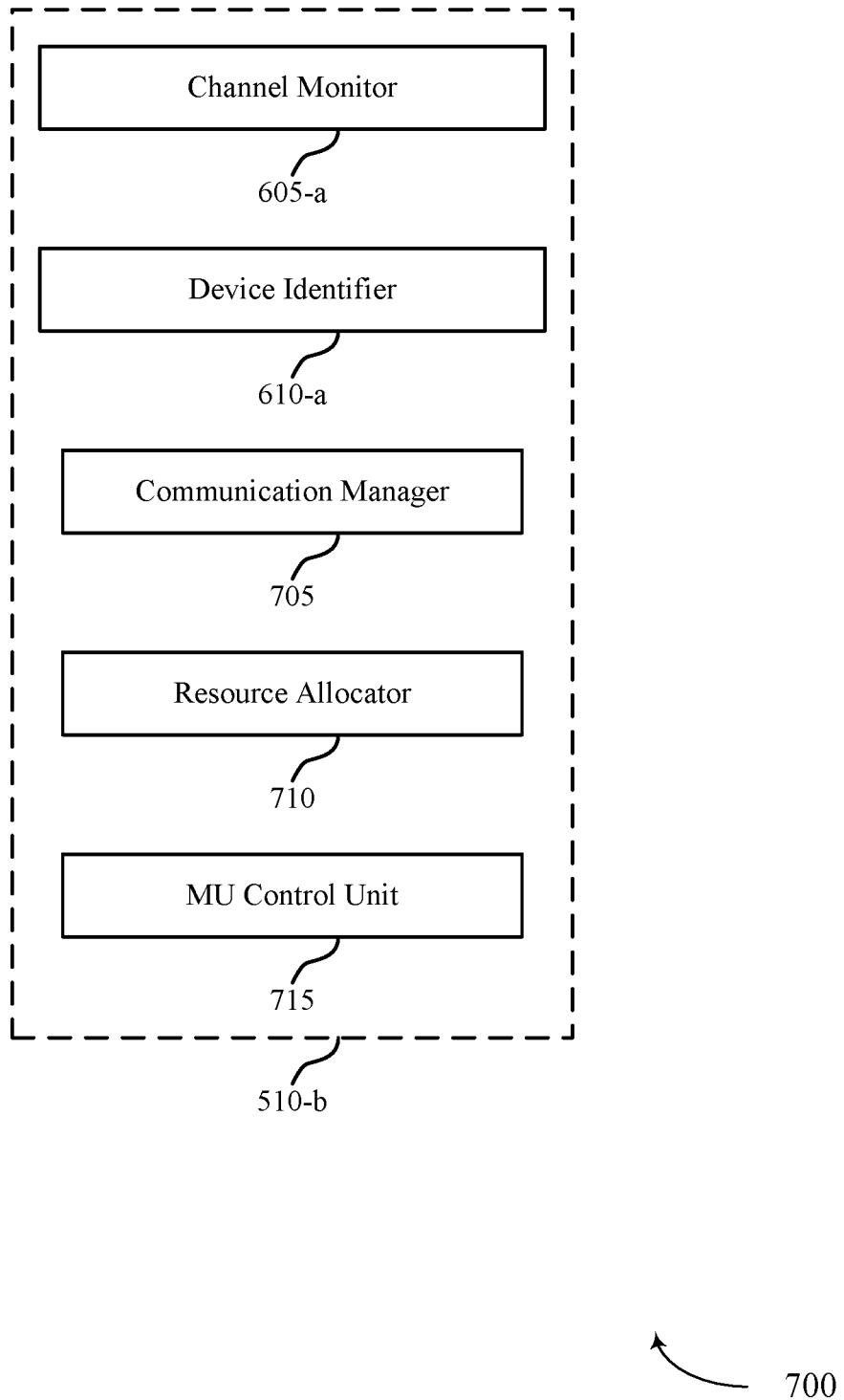

FIG. 7 shows a block diagram 700 of an MU protection module 510-b which may be a component of a wireless device 500 or a wireless device 600 for techniques for protecting communications in WLAN in accordance with various aspects of the present disclosure. The MU protection module 510-b may be an example of aspects of an MU protection module 510 described with reference to FIGS. 5-6. The MU protection module 510-b may include a channel monitor 605-a, and a device identifier 610-a. Each of these modules may perform the functions described with reference to FIG. 6. The MU protection module 510-b may also include a communication manager 705, a resource allocator 710, and an MU control unit 715.

The communication manager 705 may be configured such that the first message, the second message, and/or the trigger frame comprise a duration field that indicates a duration that covers at least one subsequent uplink transmission as described with reference to FIGS. 2-4. In some examples, the first message, the second message, and/or the trigger frame comprise a duration field that indicates a duration that covers at least one subsequent uplink transmission and at least one subsequent downlink acknowledgment message of the at least one subsequent uplink transmission. In some examples, the first message may be addressed to the plurality of wireless devices and the trigger frame may be addressed to an identified subset of the plurality of wireless devices. The communication manager 705 may also allocate uplink resources to the identified subset of wireless devices. In some examples, the trigger frame comprises a medium access control (MAC) trigger frame or a physical layer (PHY) trigger frame. In some examples, the MAC trigger frame comprises a network allocation vector (NAV) field. In some examples, the PHY trigger frame comprises a transmit opportunity (TXOP) field comprising a high efficiency signal field (HE-SIG) or a duplicate legacy signal field (L-SIG). In some examples, the first message comprises a multi-user (MU) request to send (RTS) frame and the second message comprises a clear to send (CTS) frame.

The resource allocator 710 may allocate uplink resources to the identified wireless device based at least in part on receiving the second message from the wireless device as described with reference to FIGS. 2-4.

The MU control unit 715 may be configured such that transmitting the first message may include transmitting a scrambler seed index on the subband of the shared frequency spectrum band as described with reference to FIGS. 2-4. In some examples, transmitting the first message comprises transmitting an uplink resource unit index on the subband of the shared frequency spectrum band. In some examples, transmitting the first message comprises transmitting an uplink channel index over a first subband of the shared frequency spectrum band. The MU control unit 715 may also transmit a second message in response to the first message, wherein the second message indicates the subband of the shared frequency spectrum band is reserved and comprises identification information of the wireless device. The MU control unit 715 may also receive an uplink resource allocation from the access point based at least in part on transmitting the second message to the access point. In some examples, receiving the first message comprises receiving a scrambler seed index on the subband of the shared frequency spectrum band. In some examples, receiving the first message comprises receiving an uplink resource unit index on the subband of the shared frequency spectrum band.

Figure 8:
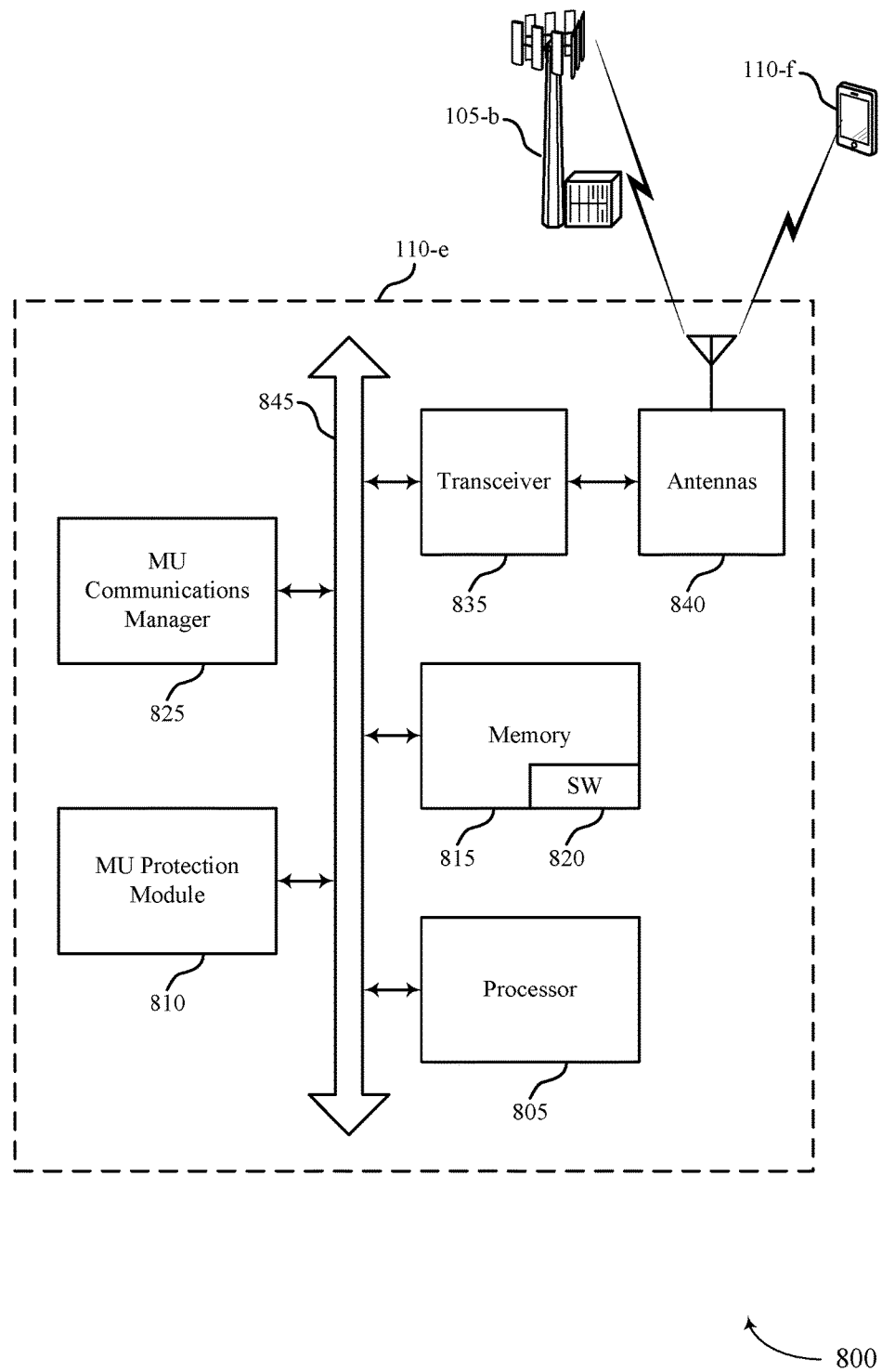
FIG. 8 illustrates a block diagram of a system including a device that supports techniques for protecting communications in WLAN in accordance with various aspects of the present disclosure.

FIG. 8 shows a diagram of a system 800 including a STA 110-e configured for techniques for protecting communications in WLAN in accordance with various aspects of the present disclosure. System 800 may include STA 110-e, which may be an example of a wireless device 500, a wireless device 600, or a STA 110 described with reference to FIGS. 1, 2 and 5-7. STA 110-e may include an MU protection module 810, which may be an example of an MU protection module 510 described with reference to FIGS. 5-7. STA 110-e may also include an MU communications manager 825. STA 110-e may also include components for bi-directional voice and data communications including components for transmitting communications and components for receiving communications. For example, STA 110-e may communicate bi-directionally with AP 105-b or STA 110-f.

STA 110-e may also include a processor 805, and memory 815 (including software (SW)) 820, a transceiver 835, and one or more antenna(s) 840, each of which may communicate, directly or indirectly, with one another (e.g., via buses 845). The transceiver 835 may communicate bi-directionally, via the antenna(s) 840 or wired or wireless links, with one or more networks, as described above. For example, the transceiver 835 may communicate bi-directionally with an AP 105 or another STA 110. The transceiver 835 may include a modem to modulate the packets and provide the modulated packets to the antenna(s) 840 for transmission, and to demodulate packets received from the antenna(s) 840. While STA 110-e may include a single antenna 840, STA 110-e may also have multiple antennas 840 capable of concurrently transmitting or receiving multiple wireless transmissions. MU communications manager 825 may be used to identify which orthogonality technique to use.

The memory 815 may include random access memory (RAM) and read only memory (ROM). The memory 815 may store computer-readable, computer-executable software/firmware code 820 including instructions that, when executed, cause the processor 805 to perform various functions described herein (e.g., techniques for protecting communications in WLAN, etc.). Alternatively, the software/firmware code 820 may not be directly executable by the processor 805 but cause a computer (e.g., when compiled and executed) to perform functions described herein. The processor 805 may include an intelligent hardware device, (e.g., a central processing unit (CPU), a microcontroller, an application specific integrated circuit (ASIC), etc.)

Figure 9:
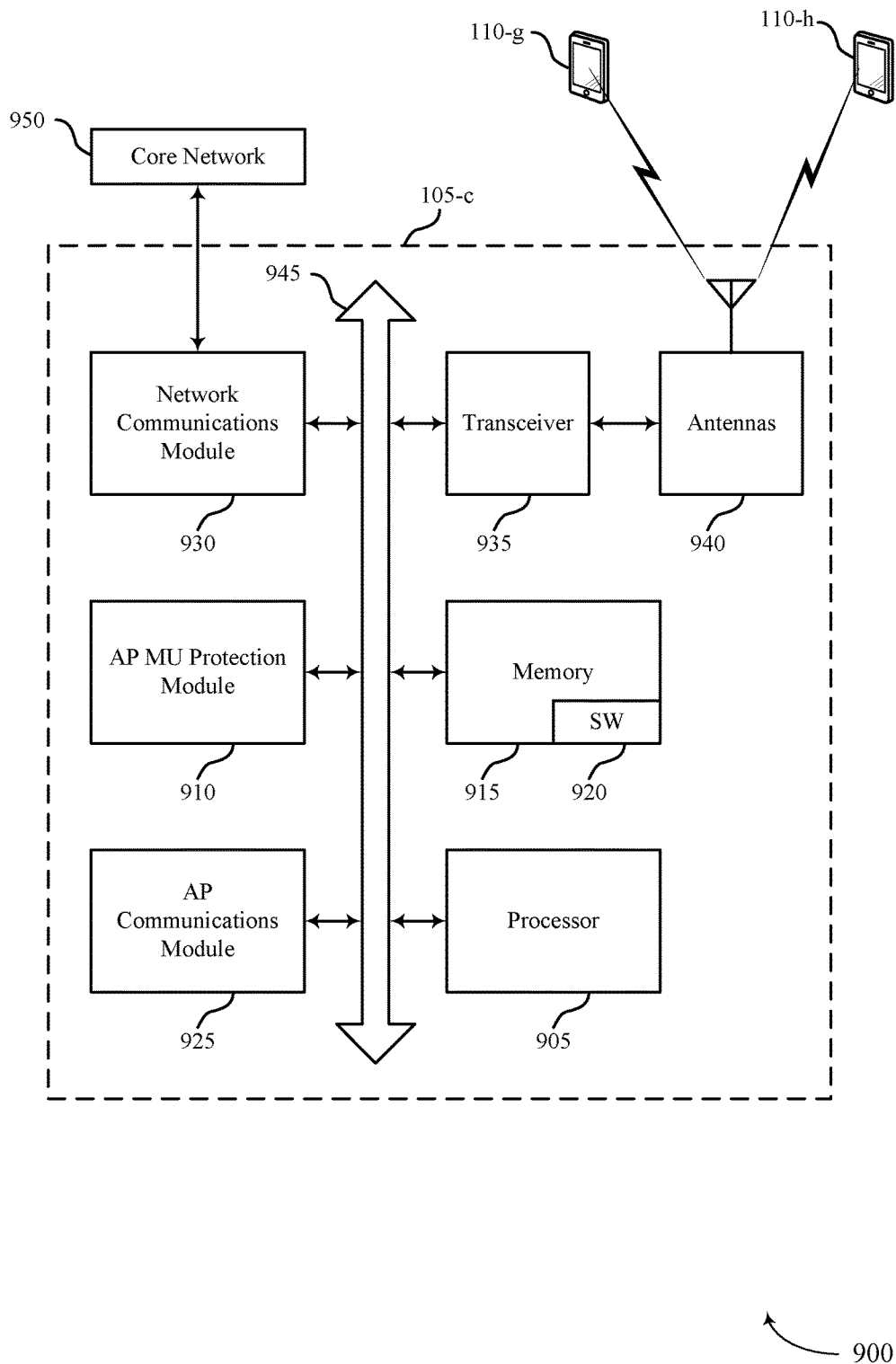
FIG. 9 illustrates a block diagram of a system including an AP that supports techniques for protecting communications in WLAN in accordance with various aspects of the present disclosure.

FIG. 9 shows a diagram of a system 900 including an AP 105-c configured for techniques for protecting communications in WLAN in accordance with various aspects of the present disclosure. System 900 may include AP 105-c, which may be an example of a wireless device 500, a wireless device 600, or an AP 105 described with reference to FIGS. 1, 2 and 6-8. AP 105-c may include an AP MU protection module 910, which may be an example of an AP MU protection module 510, 810 described with reference to FIGS. 6-8. AP 105-c may also include components for bi-directional voice and data communications including components for transmitting communications and components for receiving communications. For example, AP 105-c may communicate bi-directionally with STA 110-g or STA 110-h.

In some cases, AP 105-c may have one or more wired backhaul links. AP 105-c may have a wired backhaul link (e.g., S1 interface, etc.) to the core network 950. Each of the APs 105 may communicate with STAs 110 using the same or different wireless communications technologies. In some examples, AP communications module 925 may provide an X2 interface within a Long Term Evolution (LTE)/LTE-A wireless communication network technology to provide communication between some of the APs 105. In some cases, AP 105-c may communicate with the core network 950 through network communications module 930.

The AP 105-c may include a processor 905, memory 915 (including software (SW) 920), transceiver 935, and antenna(s) 940, which each may be in communication, directly or indirectly, with one another (e.g., over bus system 945). The transceiver 935 may be configured to communicate bi-directionally, via the antenna(s) 940, with the STAs 110, which may be multi-mode devices. The transceiver 935 (or other components of the AP 105-c) may also be configured to communicate bi-directionally, via the antennas 940, with one or more other APs (not shown). The transceiver 935 may include a modem configured to modulate the packets and provide the modulated packets to the antennas 940 for transmission, and to demodulate packets received from the antennas 940. The AP 105-c may include multiple transceivers 935, each with one or more associated antennas 940.

The transceiver may be an example of a combined receiver 505 and transmitter 515 of FIG. 5.

The memory 915 may include RAM and ROM. The memory 915 may also store computer-readable, computer-executable software code 920 containing instructions that are configured to, when executed, cause the processor 905 to perform various functions described herein (e.g., techniques for protecting communications in WLAN, selecting coverage enhancement techniques, call processing, database management, message routing, etc.). Alternatively, the software 920 may not be directly executable by the processor 905 but be configured to cause the computer, e.g., when compiled and executed, to perform functions described herein. The processor 905 may include an intelligent hardware device, e.g., a CPU, a microcontroller, an ASIC, etc. The processor 905 may include various special purpose processors such as encoders, queue processing modules, base band processors, radio head controllers, digital signal processor (DSPs), and the like.

The AP communications module 925 may manage communications with other APs 105. In some cases, a communications management module may include a controller or scheduler for controlling communications with STAs 110 in cooperation with other APs 105. For example, the AP communications module 925 may coordinate scheduling for transmissions to STAs 110 for various interference mitigation techniques such as beamforming or joint transmission.

The components of wireless device 500, wireless device 600, and MU protection module 510-b may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 10:
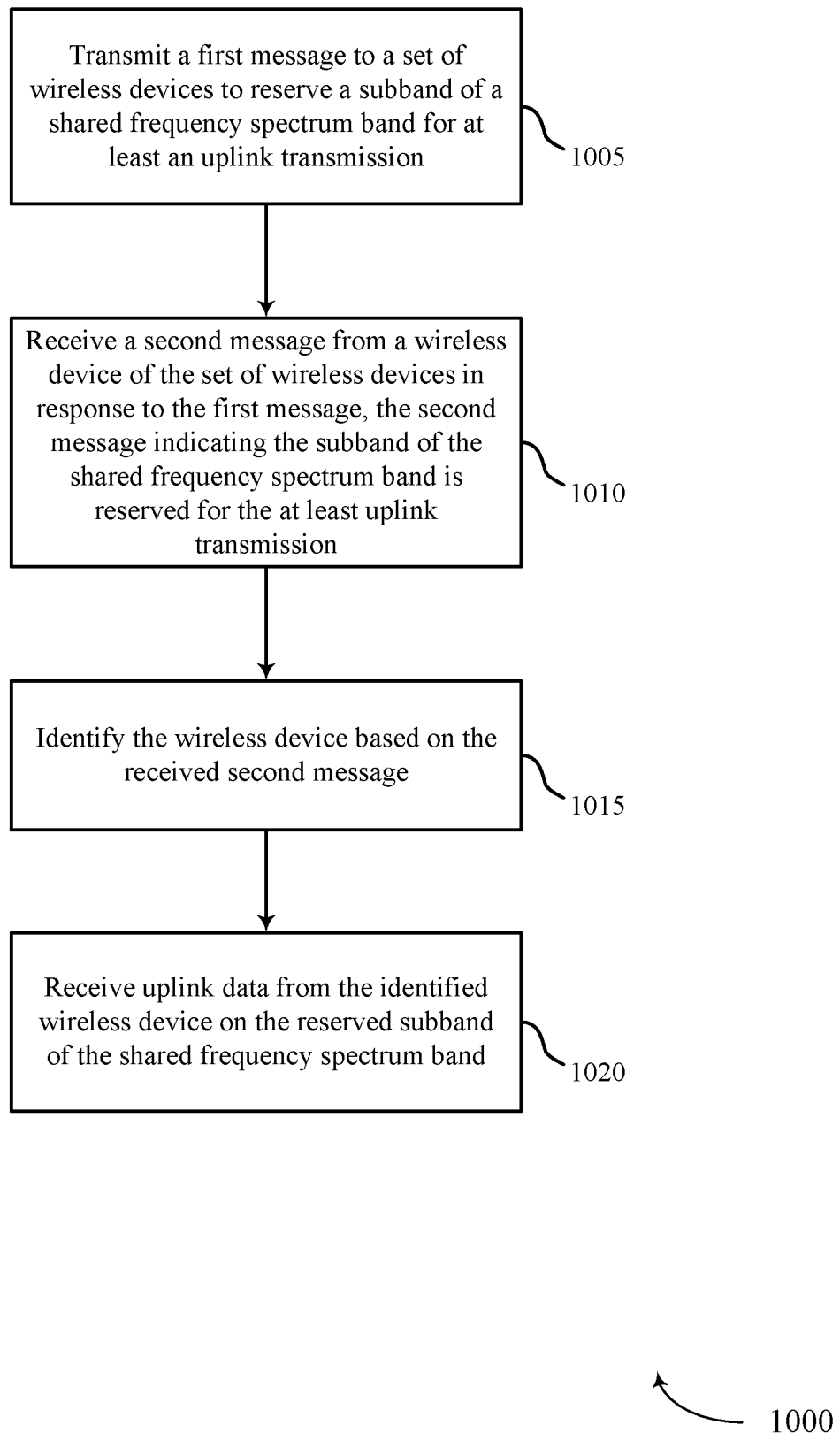
FIGS. 10-14 illustrate methods for techniques for protecting communications in WLAN in accordance with various aspects of the present disclosure.

FIG. 10 shows a flowchart illustrating a method 1000 for techniques for protecting communications in WLAN in accordance with various aspects of the present disclosure. The operations of method 1000 may be implemented by a device, such as an AP 105, or its components as described with reference to FIGS. 1-9. For example, the operations of method 1000 may be performed by the MU protection module 510 as described with reference to FIGS. 5-8. In some examples, a device may execute a set of codes to control the functional elements of the device to perform the functions described below. Additionally or alternatively, the device may perform aspects the functions described below using special-purpose hardware.

At block 1005, the device may transmit a first message to a plurality of wireless devices to reserve a subband of a shared frequency spectrum band for at least one uplink transmission as described with reference to FIGS. 2-4. In certain examples, the operations of block 1005 may be performed by the transmitter 515 as described with reference to FIG. 5.

At block 1010, the device may receive a second message from a wireless device of the plurality of wireless devices in response to the first message, the second message indicating the subband of the shared frequency spectrum band is reserved for the at least one uplink transmission as described with reference to FIGS. 2-4. In certain examples, the operations of block 1010 may be performed by the channel monitor 605 as described with reference to FIG. 6.

At block 1015, the device may identify the wireless device based at least in part on the received second message as described with reference to FIGS. 2-4. In certain examples, the operations of block 1015 may be performed by the device identifier 610 as described with reference to FIG. 6.

At block 1020, the device may receive uplink data from the identified wireless device on the reserved subband of the shared frequency spectrum band as described with reference to FIGS. 2-4. In certain examples, the operations of block 1020 may be performed by the receiver 505 as described with reference to FIG. 5.

Figure 11:
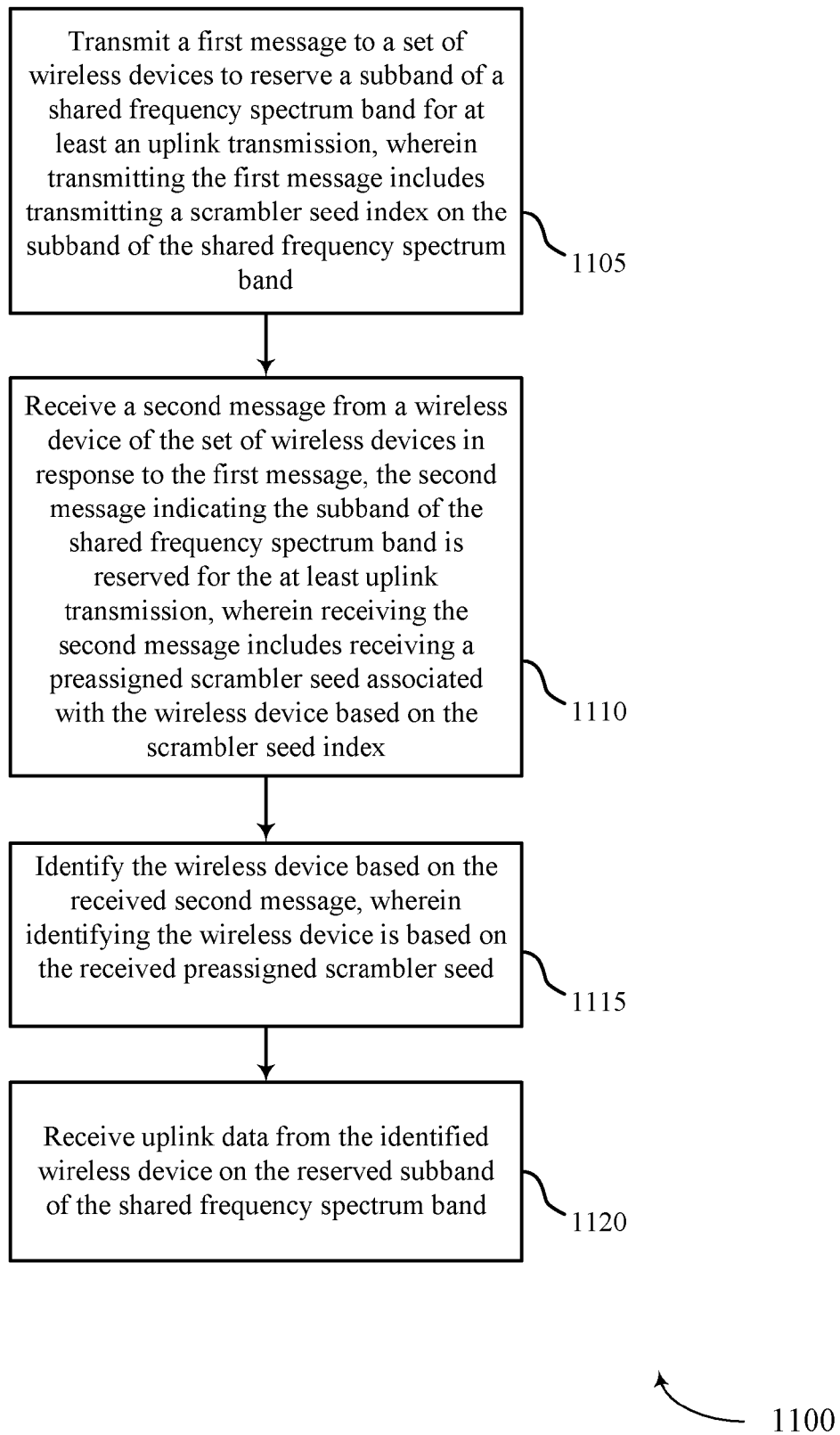

FIG. 11 shows a flowchart illustrating a method 1100 for techniques for protecting communications in WLAN in accordance with various aspects of the present disclosure. The operations of method 1100 may be implemented by a device, such as an AP 105, or its components as described with reference to FIGS. 1-9. For example, the operations of method 1100 may be performed by the MU protection module 510 as described with reference to FIGS. 5-8. In some examples, a device may execute a set of codes to control the functional elements of the device to perform the functions described below. Additionally or alternatively, the device may perform aspects the functions described below using special-purpose hardware. The method 1100 may also incorporate aspects of method 1000 of FIG. 10.

At block 1105, the device may transmit a first message to a plurality of wireless devices to reserve a subband of a shared frequency spectrum band for at least one uplink transmission as described with reference to FIGS. 2-4. In some cases, transmitting the first message comprises transmitting a scrambler seed index on the subband of the shared frequency spectrum band. In certain examples, the operations of block 1105 may be performed by the transmitter 515 as described with reference to FIG. 5.

At block 1110, the device may receive a second message from a wireless device of the plurality of wireless devices in response to the first message, the second message indicating the subband of the shared frequency spectrum band is reserved for the at least one uplink transmission as described with reference to FIGS. 2-4. In some cases, receiving the second message comprises receiving a preassigned scrambler seed associated with the wireless device based at least in part on the scrambler seed index. In certain examples, the operations of block 1110 may be performed by the channel monitor 605 as described with reference to FIG. 6.

At block 1115, the device may identify the wireless device based at least in part on the received second message as described with reference to FIGS. 2-4. In some cases, the identifying the wireless device is based at least in part on the received preassigned scrambler seed. In certain examples, the operations of block 1115 may be performed by the device identifier 610 as described with reference to FIG. 6.

At block 1120, the device may receive uplink data from the identified wireless device on the reserved subband of the shared frequency spectrum band as described with reference to FIGS. 2-4. In certain examples, the operations of block 1120 may be performed by the receiver 505 as described with reference to FIG. 5.

Figure 12:
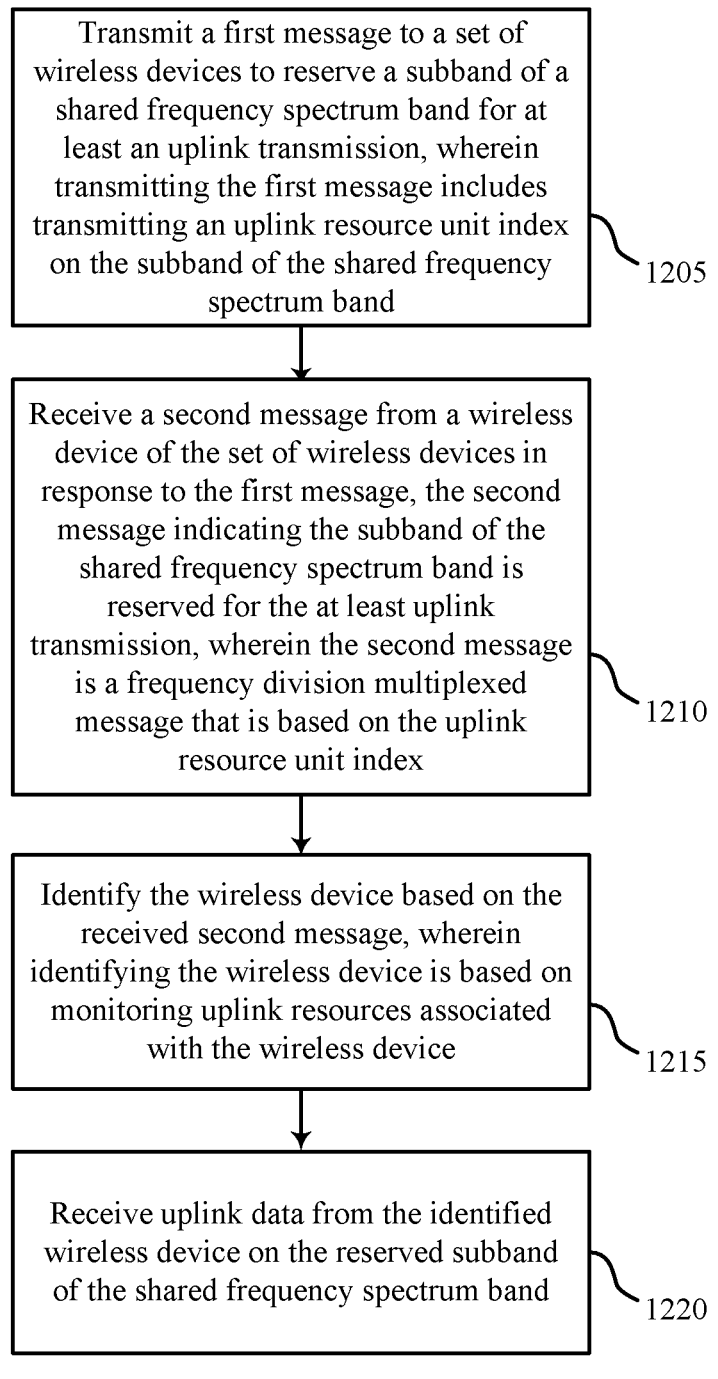

FIG. 12 shows a flowchart illustrating a method 1200 for techniques for protecting communications in WLAN in accordance with various aspects of the present disclosure. The operations of method 1200 may be implemented by a device, such as an AP 105, or its components as described with reference to FIGS. 1-9. For example, the operations of method 1200 may be performed by the MU protection module 510 as described with reference to FIGS. 5-8. In some examples, a device may execute a set of codes to control the functional elements of the device to perform the functions described below. Additionally or alternatively, the device may perform aspects the functions described below using special-purpose hardware. The method 1200 may also incorporate aspects of methods 1000, and 1100 of FIGS. 10-11.

At block 1205, the device may transmit a first message to a plurality of wireless devices to reserve a subband of a shared frequency spectrum band for at least one uplink transmission as described with reference to FIGS. 2-4. In some cases, transmitting the first message comprises transmitting an uplink resource unit index on the subband of the shared frequency spectrum band. In certain examples, the operations of block 1205 may be performed by the transmitter 515 as described with reference to FIG. 5.

At block 1210, the device may receive a second message from a wireless device of the plurality of wireless devices in response to the first message, the second message indicating the subband of the shared frequency spectrum band is reserved for the at least one uplink transmission as described with reference to FIGS. 2-4. In some cases, the second message is a frequency division multiplexed message that is based at least in part on the uplink resource unit index. In certain examples, the operations of block 1210 may be performed by the channel monitor 605 as described with reference to FIG. 6.

At block 1215, the device may identify the wireless device based at least in part on the received second message as described with reference to FIGS. 2-4. In some cases, the identifying the wireless device is based at least in part on monitoring uplink resources associated with the wireless device. In certain examples, the operations of block 1215 may be performed by the device identifier 610 as described with reference to FIG. 6.

At block 1220, the device may receive uplink data from the identified wireless device on the reserved subband of the shared frequency spectrum band as described with reference to FIGS. 2-4. In certain examples, the operations of block 1220 may be performed by the receiver 505 as described with reference to FIG. 5.

Figure 13:
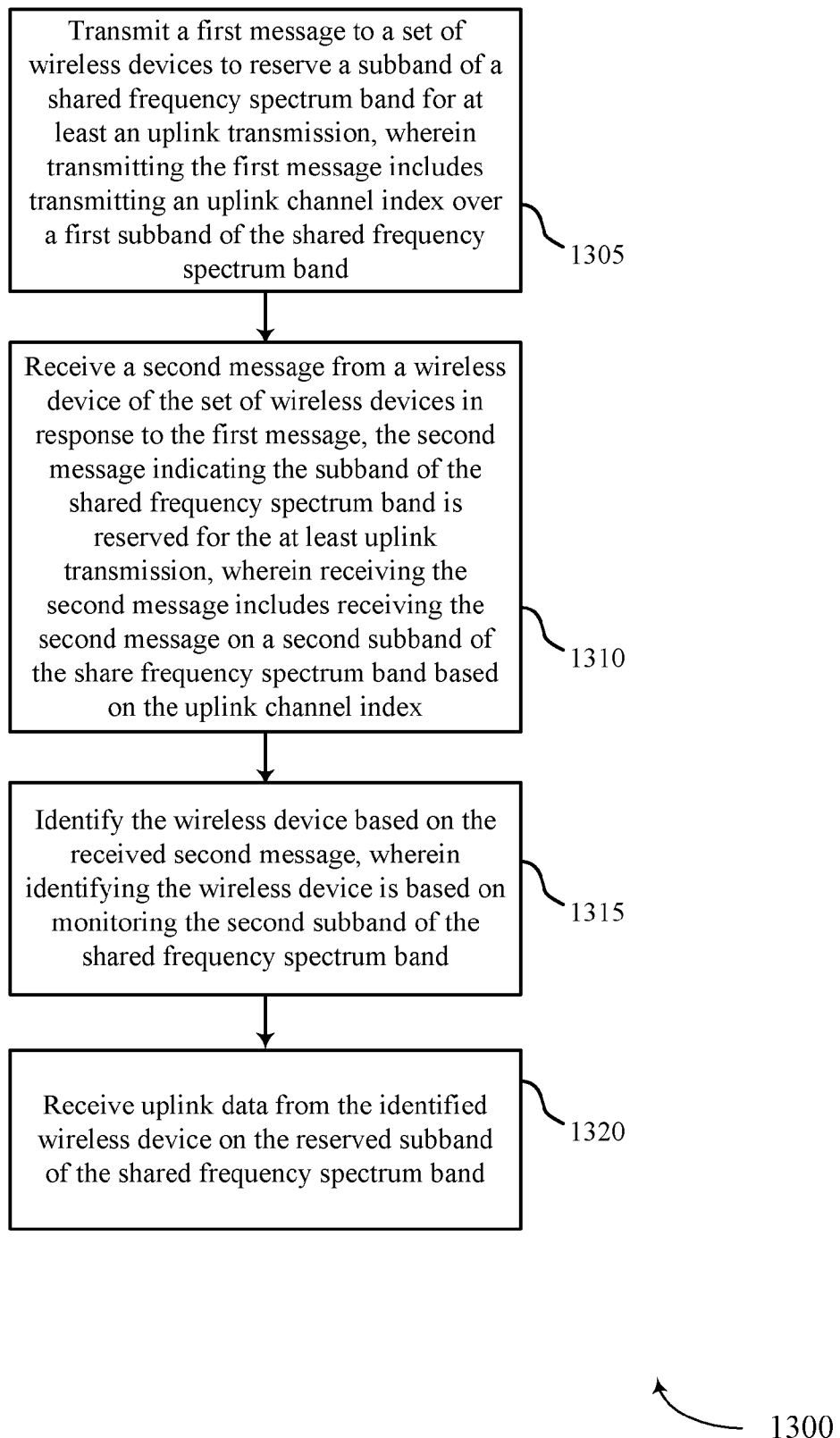

FIG. 13 shows a flowchart illustrating a method 1300 for techniques for protecting communications in WLAN in accordance with various aspects of the present disclosure. The operations of method 1300 may be implemented by a device, such as an AP 105, or its components as described with reference to FIGS. 1-9. For example, the operations of method 1300 may be performed by the MU protection module 510 as described with reference to FIGS. 5-8. In some examples, a device may execute a set of codes to control the functional elements of the device to perform the functions described below. Additionally or alternatively, the device may perform aspects the functions described below using special-purpose hardware. The method 1300 may also incorporate aspects of methods 1000, 1100, and 1200 of FIGS. 10-12.

At block 1305, the device may transmit a first message to a plurality of wireless devices to reserve a subband of a shared frequency spectrum band for at least one uplink transmission as described with reference to FIGS. 2-4. In some cases, transmitting the first message comprises transmitting an uplink channel index over a first subband of the shared frequency spectrum band. In certain examples, the operations of block 1305 may be performed by the transmitter 515 as described with reference to FIG. 5.

At block 1310, the device may receive a second message from a wireless device of the plurality of wireless devices in response to the first message, the second message indicating the subband of the shared frequency spectrum band is reserved for the at least one uplink transmission as described with reference to FIGS. 2-4. In some cases, receiving the second message comprises receiving the second message on a second subband of the shared frequency spectrum band based at least in part on the uplink channel index. In certain examples, the operations of block 1310 may be performed by the channel monitor 605 as described with reference to FIG. 6.

At block 1315, the device may identify the wireless device based at least in part on the received second message as described with reference to FIGS. 2-4. In some cases, the identifying the wireless device is based at least in part on monitoring the second subband of the shared frequency spectrum band. In certain examples, the operations of block 1315 may be performed by the device identifier 610 as described with reference to FIG. 6.

At block 1320, the device may receive uplink data from the identified wireless device on the reserved subband of the shared frequency spectrum band as described with reference to FIGS. 2-4. In certain examples, the operations of block 1320 may be performed by the receiver 505 as described with reference to FIG. 5.

Figure 14:
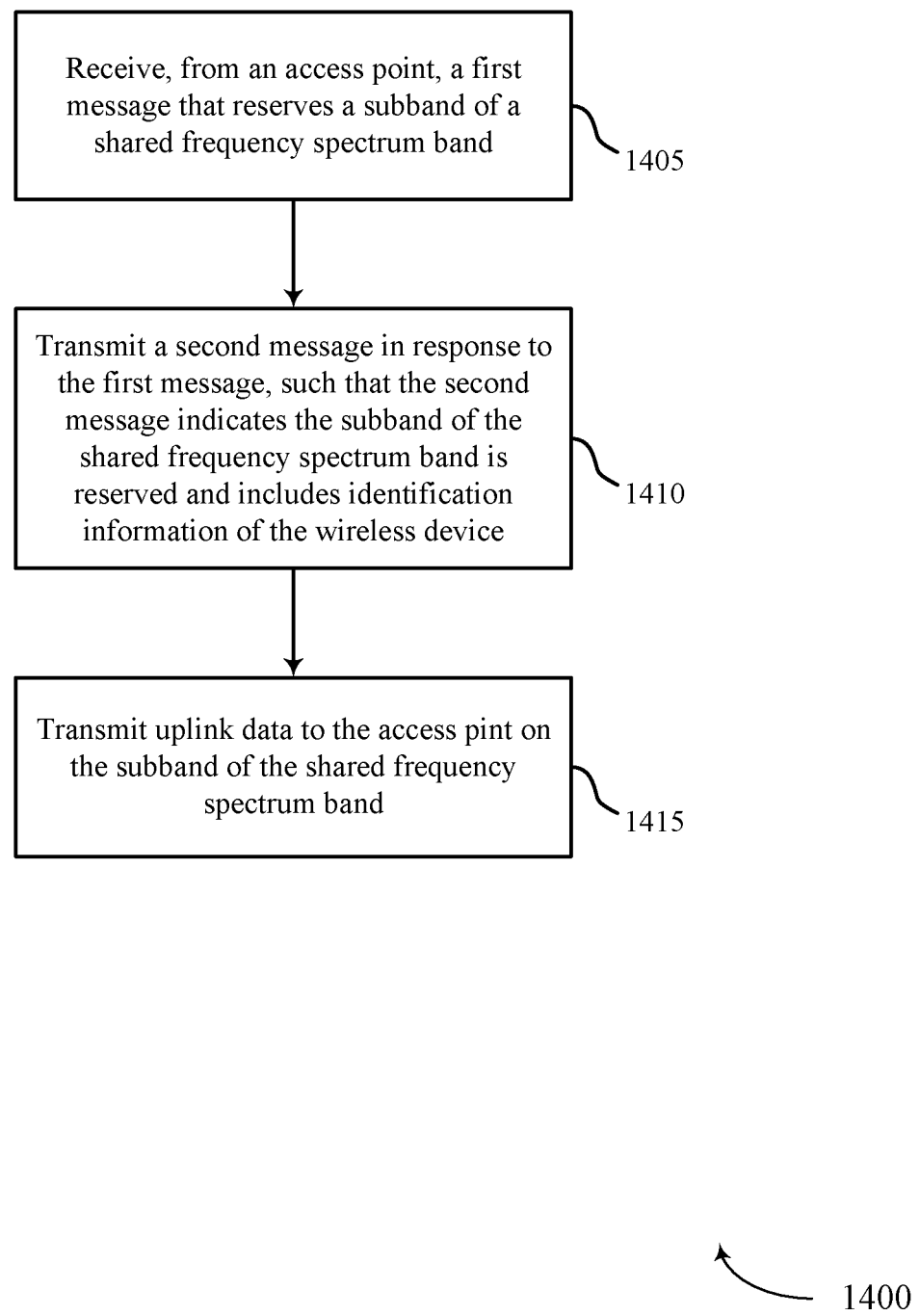

FIG. 14 shows a flowchart illustrating a method 1400 for techniques for protecting communications in WLAN in accordance with various aspects of the present disclosure. The operations of method 1400 may be implemented by a device, such as a STA 110, or its components as described with reference to FIGS. 1-9. For example, the operations of method 1400 may be performed by the MU protection module 510 as described with reference to FIGS. 5-8. In some examples, a device may execute a set of codes to control the functional elements of the device to perform the functions described below. Additionally or alternatively, the device may perform aspects the functions described below using special-purpose hardware. The method 1400 may also incorporate aspects of methods 1000, 1100, 1200, and 1300 of FIGS. 10-13.

At block 1405, the device may receive, from an access point, a first message that reserves a subband of a shared frequency spectrum band as described with reference to FIGS. 2-4. In certain examples, the operations of block 1405 may be performed by the receiver 505 as described with reference to FIG. 5.

At block 1410, the device may transmit a second message in response to the first message, wherein the second message indicates the subband of the shared frequency spectrum band is reserved and comprises identification information of the wireless device as described with reference to FIGS. 2-4. In certain examples, the operations of block 1410 may be performed by the MU control unit 715 as described with reference to FIG. 7.

At block 1415, the device may transmit uplink data to the access point on the subband of the shared frequency spectrum band as described with reference to FIGS. 2-4. In certain examples, the operations of block 1415 may be performed by the transmitter 515 as described with reference to FIG. 5.

Thus, methods 1000, 1100, 1200, 1300, and 1400 may provide for techniques for protecting communications in WLAN. It should be noted that methods 1000, 1100, 1200, 1300, and 1400 describe possible implementation, and that the operations and the steps may be rearranged or otherwise modified such that other implementations are possible. In some examples, aspects from two or more of the methods 1000, 1100, 1200, 1300, and 1400 may be combined.

The detailed description set forth above in connection with the appended drawings describes examples and does not represent all the examples that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form to avoid obscuring the concepts of the present disclosure.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Throughout this disclosure the term "example" or "exemplary" indicates an example or instance and does not imply or require any preference for the noted example. Thus, the disclosure is not to be limited to the examples and designs described herein but is to be accorded the broadest scope consistent with the principles and novel features disclosed herein.

What is claimed is:

1. A method of wireless communication comprising:
    transmitting a first message, the first message being addressed to a plurality of wireless devices, the first message including an indication to the plurality of wireless devices to respond within a first duration of time, the first message indicating to unaddressed wireless devices not addressed by the first message to refrain from contending for access to a subband of a shared frequency spectrum band during the first duration of time;
    receiving a second message from at least one wireless device of the plurality of wireless devices during the first duration of time in response to the first message, the second message indicating to the unaddressed wireless devices or to other wireless devices to refrain from contending for access to the subband of the shared frequency spectrum band during a second duration of time; and
    receiving uplink data from the at least one wireless device on the subband of the shared frequency spectrum band within the first duration of time or the second duration of time.

2. The method of claim 1, further comprising:
    transmitting a trigger frame to the at least one wireless device during the first duration of time or the second duration of time, the trigger frame indicating to the at least one wireless device to transmit the uplink data on the subband of the shared frequency spectrum band.

3. The method of claim 1, further comprising:
    allocating uplink resources to the at least one wireless device based at least in part on receiving the second message from the at least one wireless device.

4. The method of claim 1, wherein the transmitting the first message comprises transmitting a scrambler seed index on the subband of the shared frequency spectrum band.

5. The method of claim 4, wherein the receiving the second message comprises receiving a preassigned scrambler seed associated with the at least one wireless device based at least in part on the scrambler seed index, the method further comprising identifying the at least one wireless device based at least in part on the received preassigned scrambler seed.

6. The method of claim 1, wherein the transmitting the first message comprises transmitting an uplink resource unit index on the subband of the shared frequency spectrum band.

7. The method of claim 6, wherein the second message is a frequency division multiplexed message that is based at least in part on the uplink resource unit index, the method further comprising identifying the at least one wireless device based at least in part on monitoring uplink resources associated with the at least one wireless device.

8. The method of claim 1, wherein:
the transmitting the first message comprises transmitting an uplink channel index over a first subband of the shared frequency spectrum band; and
the receiving the second message comprises receiving the second message on a second subband of the shared frequency spectrum band based at least in part on the uplink channel index, the method further comprising identifying the at least one wireless device based at least in part on monitoring the second subband of the shared frequency spectrum band.

9. The method of claim 1, wherein one or both of the first message or the second message includes a physical layer (PHY) duration field that indicates the first duration of time or the second duration of time, respectively.

10. The method of claim 1, wherein one or both of the first message or the second message includes a medium access control (MAC) frame that specifies a network allocation vector (NAV) that indicates the first duration of time or the second duration of time, respectively.

11. The method of claim 2, wherein the first message is addressed to the plurality of wireless devices and wherein the trigger frame is addressed to an identified subset of the plurality of wireless devices from which respective second messages were received.

12. The method of claim 11, further comprising: allocating uplink resources for a multi-user (MU) uplink transmission to the identified subset of wireless devices.

13. The method of claim 1, wherein the first message includes a trigger frame, the trigger frame including a medium access control (MAC) trigger frame or a physical layer (PHY) trigger frame.

14. The method of claim 13, wherein the MAC trigger frame comprises a network allocation vector (NAV) field that indicates the first duration of time.

15. The method of claim 13, wherein the PHY trigger frame comprises a transmit opportunity (TXOP) field comprising a high efficiency signal field (HE-SIG) or a duplicate legacy signal field (L-SIG) that indicates the first duration of time.

16. The method of claim 1, wherein the first message comprises a multi-user (MU) request to send (RTS) frame and the at least one received respective second message comprises a clear to send (CTS) frame.

17. The method of claim 1, further including transmitting, responsive to receiving the uplink data, at least one acknowledgment message indicating an acknowledgment of the uplink data to the at least one wireless device within the first duration of time or the second duration of time.

18. A method of wireless communication comprising:

receiving, by a first wireless device from a second wireless device, a first message addressed to one or more wireless devices, the one or more wireless devices including the first wireless device, the first message including an indication to the one or more wireless devices to respond within a first duration of time, the first message indicating to unaddressed wireless devices not addressed by the first message to refrain from contending for access to a subband of a shared frequency spectrum band during the first duration of time;
transmitting a second message during the first duration of time in response to the first message, the second message indicating to the unaddressed wireless devices or to other wireless devices to refrain from contending for access to the subband of the shared frequency spectrum band during a second duration of time; and
transmitting uplink data to the second wireless device on the subband of the shared frequency spectrum band within the first duration of time or the second duration of time.

19. The method of claim 18, further comprising:
receiving a trigger frame from the second wireless device during the first duration of time or the second duration of time, the trigger frame indicating to the first wireless device to transmit uplink data on the subband of the shared frequency spectrum band.

20. The method of claim 18, further comprising:
receiving an uplink resource allocation from the second wireless device based at least in part on transmitting the second message to the second wireless device.

21. The method of claim 18, wherein the receiving the first message comprises receiving a scrambler seed index on the subband of the shared frequency spectrum band.

22. The method of claim 21, wherein the transmitting the second message comprises transmitting a preassigned scrambler seed associated with the first wireless device on the subband of the shared frequency spectrum band based at least in part on the scrambler seed index.

23. The method of claim 18, wherein the receiving the first message comprises receiving an uplink resource unit index on the subband of the shared frequency spectrum band.

24. The method of claim 18, wherein one or both of the first message or the second message includes a physical layer (PHY) duration field that indicates the first duration of time or the second duration of time, respectively.

25. The method of claim 18, wherein one or both of the first message or the second message includes a medium access control (MAC) frame that specifies a network allocation vector (NAV) that indicates the first duration of time or the second duration of time, respectively.

26. An apparatus for wireless communication, comprising:
a transmitter for transmitting a first message, the first message being addressed to a plurality of wireless devices, the first message including an indication to the plurality of wireless devices to respond within a first duration of time, the first message indicating to unaddressed wireless devices not addressed by the first message to refrain from contending for access to a subband of a shared frequency spectrum band during the first duration of time;
a channel monitor for receiving a second message from at least one wireless device of the plurality of wireless devices during the first duration of time in response to the first message, the second message indicating to the unaddressed wireless devices or to other wireless devices to refrain from contending for access to the subband of the shared frequency spectrum band during a second duration of time; and a receiver for receiving uplink data from the at least one wireless device on the subband of the shared frequency spectrum band within the first duration of time or the second duration of time.

27. The apparatus of claim 26, wherein the transmitter further transmits a trigger frame to the at least one wireless device during the first duration of time or the second duration of time, the trigger frame indicating to the at least one wireless device to transmit the uplink data on the subband of the shared frequency spectrum band.

28. The apparatus of claim 26, further comprising:
a resource allocator for allocating uplink resources to the at least one wireless device based at least in part on receiving the second message from the at least one wireless device.

29. The apparatus of claim 26, wherein the transmitter is further configured to transmit a scrambler seed index on the subband of the shared frequency spectrum band.

30. The apparatus of claim 29, wherein the channel monitor is further configured to receive a preassigned scrambler seed associated with the at least one wireless device based at least in part on the scrambler seed index, the apparatus further comprising a device identifier for identifying the at least one wireless device based at least in part on the received preassigned scrambler seed.

31. The apparatus of claim 26, wherein the transmitting the first message comprises transmitting an uplink resource unit index on the subband of the shared frequency spectrum band.

32. The apparatus of claim 31, wherein the second message is a frequency division multiplexed message that is based at least in part on the uplink resource unit index, the apparatus further comprising a device identifier for identifying the at least one wireless device based at least in part on monitoring uplink resources associated with the at least one wireless device.

33. The apparatus of claim 26, wherein:
the transmitting the first message comprises transmitting an uplink channel index over a first subband of the shared frequency spectrum band; and
the receiving the second message comprises receiving the second message on a second subband of the shared frequency spectrum band based at least in part on the uplink channel index, the apparatus further comprising a device identifier for identifying the at least one wireless device is based at least in part on monitoring the second subband of the shared frequency spectrum band.

34. The apparatus of claim 26, wherein one or both of the first message or the second message includes a physical layer (PHY) duration field that indicates the first duration of time or the second duration of time, respectively.

35. The apparatus of claim 26, wherein one or both of the first message or the second message includes a medium access control (MAC) frame that specifies a network allocation vector (NAV) that indicates the first duration of time or the second duration of time, respectively.

36. The apparatus of claim 26, wherein the transmitter is further configured to transmit, responsive to receiving the uplink data, at least one acknowledgment message indicating an acknowledgment of the uplink data to the at least one wireless device within the first duration of time or the second duration of time.

37. The apparatus of claim 27, wherein the first message is addressed to the plurality of wireless devices and wherein the trigger frame is addressed to an identified subset of the plurality of wireless devices from which respective second messages were received.

38. An apparatus for wireless communication comprising:
a receiver for receiving, from a second wireless device, a first message addressed to one or more wireless devices, the one or more wireless devices including the apparatus, the first message including an indication to the one or more wireless devices to respond within a first duration of time, the first message indicating to unaddressed wireless devices not addressed by the first message to refrain from contending for access to a subband of a shared frequency spectrum band during the first duration of time;
a multi-user (MU) control unit for transmitting a second message during the first duration of time in response to the first message, the second message indicating to the unaddressed wireless devices or to other wireless devices to refrain from contending for access to the subband of the shared frequency spectrum band during a second duration of time; and
a transmitter for transmitting uplink data to the second wireless device on the subband of the shared frequency spectrum band within the first duration of time or the second duration of time.

39. The apparatus of claim 38, wherein the receiver is further configured to receive a trigger frame from the second wireless device during the first duration of time or the second duration of time, the trigger frame indicating to the apparatus to transmit uplink data on the subband of the shared frequency spectrum band.

40. The apparatus of claim 38, wherein the MU control unit is further configured to receive an uplink resource allocation from the second wireless device based at least in part on transmitting the second message to the second wireless device.

41. The apparatus of claim 38, wherein the receiving the first message comprises receiving a scrambler seed index on the subband of the shared frequency spectrum band.

42. The apparatus of claim 41, wherein the transmitting the second message comprises transmitting a preassigned scrambler seed associated with the apparatus on the subband of the shared frequency spectrum band based at least in part on the scrambler seed index.

43. The apparatus of claim 38, wherein the receiving the first message comprises receiving an uplink resource unit index on the subband of the shared frequency spectrum band.

44. The apparatus of claim 38, wherein one or both of the first message or the second message includes a physical layer (PHY) duration field that indicates the first duration of time or the second duration of time, respectively.

45. The apparatus of claim 38, wherein one or both of the first message or the second message includes a medium access control (MAC) frame that specifies a network allocation vector (NAV) that indicates the first duration of time or the second duration of time, respectively.

46. An apparatus for wireless communication comprising:
a processor;
memory in electronic communication with the processor; and
instructions stored in the memory and operable, when executed by the processor, to cause the apparatus to:
transmit a first message, the first message being addressed to a plurality of wireless devices, the first message including an indication to the plurality of wireless devices to respond within a first duration of time, the first message indicating to unaddressed wireless devices not addressed by the first message to refrain from contending for access to a subband of a shared frequency spectrum band during the first duration of time;

receive a second message from at least one wireless device of the plurality of wireless devices during the first duration of time in response to the first message, the second message indicating to the unaddressed wireless devices or to other wireless devices to refrain from contending for access to the subband of the shared frequency spectrum band during a second duration of time; and receive uplink data from the at least one wireless device on the subband of the shared frequency spectrum band within the first duration of time or the second duration of time.

47. The apparatus of claim 46, wherein the instructions are operable to cause the apparatus to:
transmit a trigger frame to the at least one wireless device during the first duration of time or the second duration of time, the trigger frame indicating to the at least one wireless device to transmit the uplink data on the subband of the shared frequency spectrum band.

48. The apparatus of claim 46, wherein the instructions are operable to cause the apparatus to:
allocate uplink resources to the at least one wireless device based at least in part on receiving the second message from the at least one wireless device.

49. The apparatus of claim 46, wherein the transmitting the first message comprises transmitting a scrambler seed index on the subband of the shared frequency spectrum band.

50. The apparatus of claim 49, wherein the receiving the second message comprises receiving a preassigned scrambler seed associated with the at least one wireless device based at least in part on the scrambler seed index, and the instructions are operable to cause the apparatus to identify the at least one wireless device based at least in part on the received preassigned scrambler seed.

51. The apparatus of claim 46, wherein the transmitting the first message comprises transmitting an uplink resource unit index on the subband of the shared frequency spectrum band.

52. The apparatus of claim 51, wherein the second message is a frequency division multiplexed message that is based at least in part on the uplink resource unit index, and the instructions are operable to cause the apparatus to identify the at least one wireless device based at least in part on monitoring uplink resources associated with the wireless device.

53. The apparatus of claim 46, wherein:
the transmitting the first message comprises transmitting an uplink channel index over a first subband of the shared frequency spectrum band;
the receiving the second message comprises receiving the second message on a second subband of the shared frequency spectrum band based at least in part on the uplink channel index; and
the instructions are operable to cause the apparatus to identify the at least one wireless device based at least in part on monitoring the second subband of the shared frequency spectrum band.

54. The apparatus of claim 46, wherein the first message comprises a multi-user (MU) request to send (RTS) frame and the at least one received respective second message comprises a clear to send (CTS) frame.

55. The apparatus of claim 46, wherein one or both of the first message or the second message includes a physical layer (PHY) duration field that indicates the first duration of time or the second duration of time, respectively.

56. The apparatus of claim 46, wherein the instructions are further operable, when executed by the processor, to cause the apparatus to transmit, responsive to receiving the uplink data, at least one acknowledgment message indicating an acknowledgment of the uplink data to the at least one wireless device within the first duration of time or the second duration of time.

57. The apparatus of claim 46, wherein one or both of the first message or the second message includes a medium access control (MAC) frame that specifies a network allocation vector (NAV) that indicates the first duration of time or the second duration of time, respectively.

58. The apparatus of claim 47, wherein the first message is addressed to the plurality of wireless devices and wherein the trigger frame is addressed to an identified subset of the plurality of wireless devices from which respective second messages were received.

59. An apparatus for wireless communication comprising:
a processor;
memory in electronic communication with the processor; and
instructions stored in the memory and operable, when executed by the processor, to cause the apparatus to:
receive, from a second wireless device, a first message addressed to one or more wireless devices, the one or more wireless devices including the apparatus, the first message including an indication to the one or more wireless devices to respond within a first duration of time, the first message indicating to unaddressed wireless devices not addressed by the first message to refrain from contending for access to a subband of a shared frequency spectrum band during the first duration of time;
transmit a second message during the first duration of time in response to the first message, the second message indicating to the unaddressed wireless devices or to other wireless devices to refrain from contending for access to the subband of the shared frequency spectrum band during a second duration of time; and
transmit uplink data to the second wireless device on the subband of the shared frequency spectrum band within the first duration of time or the second duration of time.

60. The apparatus of claim 59, wherein the instructions are operable to cause the apparatus to:
receive a trigger frame from the second wireless device during the first duration of time or the second duration of time, the trigger frame indicating to the first wireless device to transmit uplink data on the subband of the shared frequency spectrum band.

61. The apparatus of claim 59, wherein the instructions are operable to cause the apparatus to:
receive an uplink resource allocation from the second wireless device based at least in part on transmitting the second message to the second wireless device.

62. The apparatus of claim 59, wherein the first message comprises a scrambler seed index.

63. The apparatus of claim 62, wherein the second message comprises a preassigned scrambler seed associated with the apparatus based at least in part on the scrambler seed index.

64. The apparatus of claim 59, wherein the first message comprises an uplink resource unit index.

65. The apparatus of claim 59, wherein one or both of the first message or the second message includes a physical layer (PHY) duration field that indicates the first duration of time or the second duration of time, respectively.

66. The apparatus of claim 59, wherein one or both of the first message or the second message includes a medium access control (MAC) frame that specifies a network allocation vector (NAV) that indicates the first duration of time or the second duration of time, respectively.

67. A non-transitory computer-readable medium storing code for wireless communication, the code comprising instructions executable to:
   transmit a first message, the first message being addressed to a plurality of wireless devices, the first message including an indication to the plurality of wireless devices to respond within a first duration of time, the first message indicating to unaddressed wireless devices not addressed by the first message to refrain from contending for access to a subband of a shared frequency spectrum band during the first duration of time;
   receive a second message from at least one wireless device of the plurality of wireless devices during the first duration of time in response to the first message, the second message indicating to the unaddressed wireless devices or to other wireless devices to refrain from contending for access to the subband of the shared frequency spectrum band during a second duration of time; and
   receive uplink data from the at least one wireless device on the subband of the shared frequency spectrum band within the first duration of time or the second duration of time.

68. A non-transitory computer-readable medium storing code for wireless communication, the code comprising instructions executable to:
   receive, by a first wireless device from a second wireless device, a first message addressed to one or more wireless devices, the one or more wireless devices including the first wireless device, the first message including an indication to the one or more wireless devices to respond within a first duration of time, the first message indicating to unaddressed wireless devices not addressed by the first message to refrain from contending for access to a subband of a shared frequency spectrum band during the first duration of time;
   transmit a second message during the first duration of time in response to the first message, the second message indicating to the unaddressed wireless devices or to other wireless devices to refrain from contending for access to the subband of the shared frequency spectrum band during a second duration of time; and
   transmit uplink data to the second wireless device on the subband of the shared frequency spectrum band within the first duration of time or the second duration of time.

* * * * *